(12) United States Patent
Nakashima et al.

(10) Patent No.: US 10,023,412 B2
(45) Date of Patent: Jul. 17, 2018

(54) IMAGE READING APPARATUS

(71) Applicant: Brother Kogyo Kabushiki Kaisha, Nagoya-shi, Aichi-ken (JP)

(72) Inventors: Kazuhiro Nakashima, Nagoya (JP); Katsuro Miura, Toyota (JP); Noriyuki Kawamata, Nagoya (JP); Tianjin Xie, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/596,102

(22) Filed: May 16, 2017

(65) Prior Publication Data

US 2017/0327331 A1 Nov. 16, 2017

(30) Foreign Application Priority Data

May 16, 2016 (JP) ................................. 2016-097608

(51) Int. Cl.
| | |
|---|---|
| *B65H 3/44* | (2006.01) |
| *B65H 5/26* | (2006.01) |
| *B65H 7/02* | (2006.01) |
| *H04N 1/00* | (2006.01) |

(52) U.S. Cl.
CPC ............. *B65H 5/26* (2013.01); *B65H 3/44* (2013.01); *B65H 7/02* (2013.01); *H04N 1/00602* (2013.01); *H04N 1/00604* (2013.01); *H04N 1/00612* (2013.01); *H04N 1/00615* (2013.01); *B65H 2801/39* (2013.01); *H04N 2201/0094* (2013.01)

(58) Field of Classification Search
CPC ... B65H 3/44; B65H 5/26; B65H 3/56; H04N 1/00602; H04N 1/00623; H04N 1/00612
See application file for complete search history.

(56) References Cited

U.S. PATENT DOCUMENTS

| | | | |
|---|---|---|---|
| 7,806,397 B2 * | 10/2010 | Wang | ....................... B65H 3/44 271/9.01 |
| 8,508,817 B2 | 8/2013 | Sato | |
| 8,760,737 B2 * | 6/2014 | Mizuno | .............. H04N 1/00535 271/264 |
| 2010/0157391 A1 | 6/2010 | Sato | |

FOREIGN PATENT DOCUMENTS

| | | | |
|---|---|---|---|
| JP | 02198954 A | * | 8/1990 |
| JP | 5546845 B2 | | 7/2014 |

\* cited by examiner

*Primary Examiner* — Luis A Gonzalez
(74) *Attorney, Agent, or Firm* — Banner & Witcoff, Ltd.

(57) ABSTRACT

A conveying device conveys a sheet selectively along a first conveying path and a second conveying path which are connected at a junction into a common path portion. A reading unit reads an image of a sheet conveyed in the common path portion. A shutter is disposed in the second conveying path at a position upstream of the junction in a sheet conveying direction. The shutter is movable between a first position and a second position. The actuator is disposed in the common path portion and movable between a third position and a fourth position in response to the shutter moving between the first position and the second position, respectively. In a case where a detection sensor detects that the actuator is at the fourth position, a controller controls the conveying device to convey the sheet along the second conveying path.

20 Claims, 15 Drawing Sheets

IMAGE READING APPARATUS

CROSS-REFERENCE TO RELATED APPLICATION

This application claims priority from Japanese Patent Application No. 2016-097608 filed on May 16, 2016, the content of which is incorporated herein by reference in its entirety.

FIELD OF DISCLOSURE

Aspects disclosed herein relates to an image reading apparatus.

BACKGROUND

A known image reading apparatus includes a reading unit and a conveying device. The conveying device conveys a sheet to the reading unit selectively along a main path and a bypass path. The main path and the bypass path are joined, at a junction, into a common downstream path portion shared by the main path and the bypass path. A sheet detection sensor is disposed at a sheet support which supports a sheet inserted into the bypass path.

The reading unit is disposed in the common downstream path portion to read an image of the sheet conveyed by the conveying device. The known image reading apparatus generates shading correction data by means of the reading unit which reads a color reference member. Data of an image read by the reading unit is corrected using the shading correction data to improve image data quality.

SUMMARY

In the known image reading apparatus, extraneous light may enter the reading unit if the bypass path extends substantially straight from the sheet support toward the reading unit. Such extraneous light may prevent the reading unit from reading the color reference member accurately, causing the image reading apparatus to generate less accurate shading correction data.

It may be beneficial to provide an image reading apparatus which ensures that high quality image data is obtained and in which a reading unit is configured to read an image of a sheet, selectively conveyed along a first conveying path and a second conveying path, accurately without being affected by extraneous light.

According to one or more aspects of the disclosure, an image reading apparatus comprises a conveying device, at least one reading unit, a shutter, an actuator, a detection sensor, and a controller. The conveying device defines a first conveying path and a second conveying path which are joined at a junction into a common path portion shared by the first conveying path and the second conveying path, and is configured to convey a sheet selectively along the first conveying path and the second conveying path. The at least one reading unit is configured to read an image of the sheet conveyed in the common path portion. The shutter is disposed in the second conveying path at a position upstream of the junction in a sheet conveying direction. The shutter is movable between a first position at which the shutter blocks the second conveying path and a second position at which the shutter opens the second conveying path. The actuator is disposed in the common path portion and movable between a third position and a fourth position in response to the shutter moving between the first position and the second position, respectively. The detection sensor is configured to detect whether the actuator is at the fourth position. The controller is configured to, in a case where the detection sensor detects that the actuator is at the fourth position, control the conveying device to convey the sheet along the second conveying path.

According to one or more aspects of the disclosure, an image reading apparatus comprises a tray, an insertion guide, a conveying device, a reading unit, a partition rib, a shutter, an actuator, and a detection sensor. The tray is configured to support a sheet to be conveyed into a first conveying path. The insertion guide is configured to guide insertion of a sheet into a second conveying path. The conveying device is configured to convey the sheet selectively along the first conveying path and the second conveying path. The first conveying path and the second conveying path are joined at a junction into a common path portion shared by the first conveying path and the second conveying path. The reading unit is disposed in the common path portion and configured to read an image of the sheet conveyed by the conveying device. The partition rib is disposed between the insertion guide and the junction in the second conveying path. The insertion guide extends over an entire width of an area where the sheet is conveyed, the width being orthogonal to a sheet conveying direction. The shutter is movable between a first position at which the shutter contacts the partition rib to block the second conveying path, and a second position at which the shutter is separated from the partition rib to open the second conveying path. The shutter extends over the entire width of the area where the sheet is conveyed. The actuator is disposed in the common path portion at a position upstream of the reading unit in the sheet conveying direction, and is movable between a third position and a fourth position. The detection sensor is configured to detect whether the actuator is at the fourth position. In a case where the sheet is inserted along the insertion guide into the second conveying path, the shutter moves from the first position to the second position upon contact with the inserted sheet, and the actuator moves from the third position to the fourth position in response to the shutter moving from the first position to the second position. In a case where the sheet is conveyed along the first conveying path from the tray toward the reading unit, the actuator moves from the third position to the fourth position, independently of the shutter located at the first position, upon contact with the sheet conveyed into the common path portion.

According to one or more aspects of the disclosure, an image reading apparatus comprises a tray, an insertion guide, a first roller, a second roller, a reading unit, a partition rib, a shutter, an actuator, and a controller. The tray extends along a first conveying path. The insertion guide extends along a second conveying path. One end of the first conveying path meets one end of the second conveying path at a junction from which a common path extends. The first roller is disposed in the first conveying path. The second roller is disposed in the common path. The reading unit is disposed in the common path and configured to read an image. The partition rib is disposed in the second conveying path and between the insertion guide and the junction. The partition rib has a first width orthogonal to an extending direction of the second conveying path, the first width being greater than or equal to a particular width. The shutter is disposed in the second conveying path and has a first link, and is movable between a first shutter position and a second shutter position. The shutter has a second width orthogonal to the extending direction of the second conveying path, the second width being greater than or equal to the particular width. The actuator is disposed in the common path and has a second link, and is movable between a first actuator position and a second actuator position. The detector is disposed in the common path. When the shutter is at the first shutter position, the shutter contacts the partition rib. When the shutter is at the second shutter position, the first link of the shutter causes the second link of the actuator to move the actuator from the first actuator position to the second actuator position. The controller is configured to, when the controller determines that the detector detects movement of the actuator from the first actuator position to the second actuator position, cause the second roller to start rotating for conveying a sheet on the insertion guide to the reading unit.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Hereinafter, first to fourth illustrative embodiments of the disclosure will be described with reference to the accompanying drawings.

First Illustrative Embodiment

Figure 1:
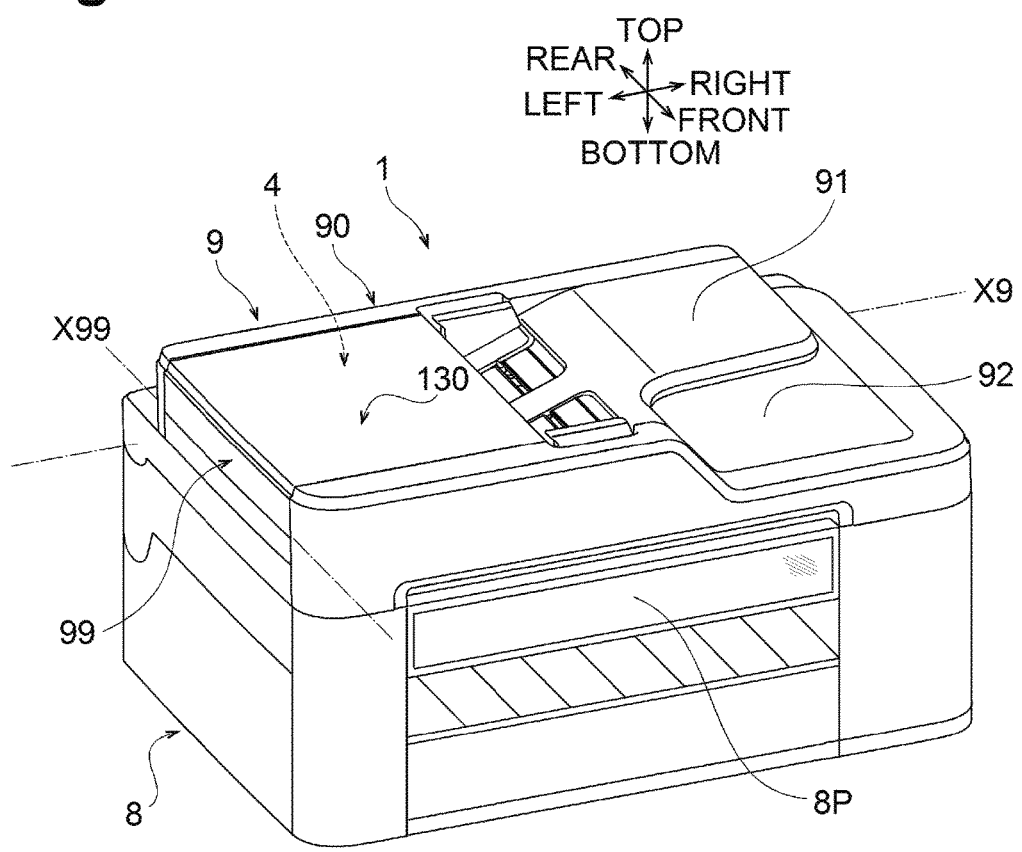
FIG. 1 is a perspective view of an image reading apparatus in a first illustrative embodiment according to one or more aspects of the disclosure.

FIG. 1 illustrates an image reading apparatus 1 according to the first illustrative embodiment. As illustrated in FIG. 1, a top-bottom direction may be defined with reference to an orientation of the multifunction device 1 that may be disposed in an orientation in which it may be intended to be used. A side of the image reading apparatus 1, in which an operation panel 8P may be provided, may be defined as the front of the image reading apparatus 1. A front-rear direction may be defined with reference to the front of the image reading apparatus 1. A right-left direction may be defined with respect to the image reading apparatus 1 as viewed from its front. The directions defined in FIG. 1 may be applicable to all the drawings. Hereinafter, the image reading apparatus 1 will be described with reference to appropriate drawings.

<Overall Configuration>

As illustrated in FIGS. 1 to 6, the image reading apparatus 1 includes a main unit 8, an openable unit 9, an image forming device 5, a reading device 3, and a conveying device 4. The main unit 8 has a substantially box shape with a relatively lower height. As illustrated in FIG. 1, the main unit 8 includes the operation panel 8P, e.g., a touch panel, at its front. The operation panel 8P is configured to accept an input for operating the image forming device 5, the reading device 3, and the conveying device 4. The operation panel 8P is further configured to display thereon various information, for example, settings and operating status of each of the image forming device 5, the reading device 3, and the conveying device 4.

Figure 2:
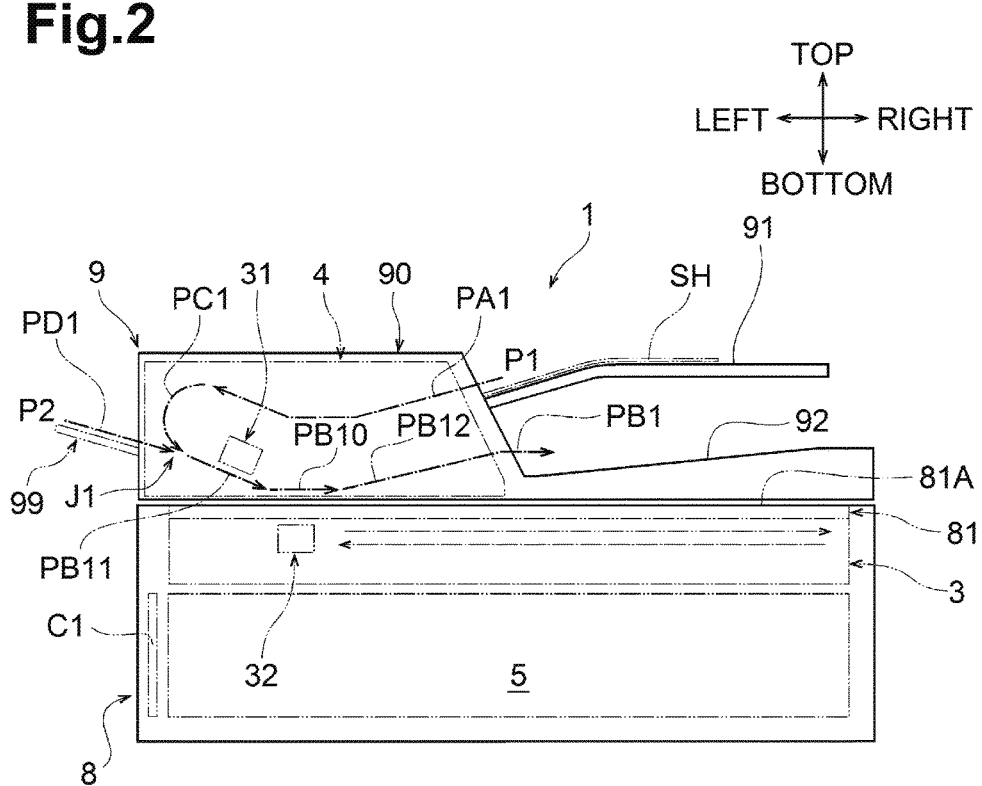
FIG. 2 is a schematic front view of the image reading apparatus in the first illustrative embodiment according to one or more aspects of the disclosure.

As illustrated in FIG. 2, the reading device 3 is disposed in an upper portion of the main unit 8. The image forming device 5 is disposed in a lower portion of the main unit 8. The image forming device 5 is configured to form an image onto a sheet by an inkjet recording method or by a laser recording method. The image reading apparatus 1 further includes a controller C1. The controller C1 is disposed to the left of the image forming device 5 in the lower portion of the main unit 8. The controller C1 is configured to control the image forming device 5, the reading device 3, the conveying device 4, and the operation panel 8P.

Figure 3:
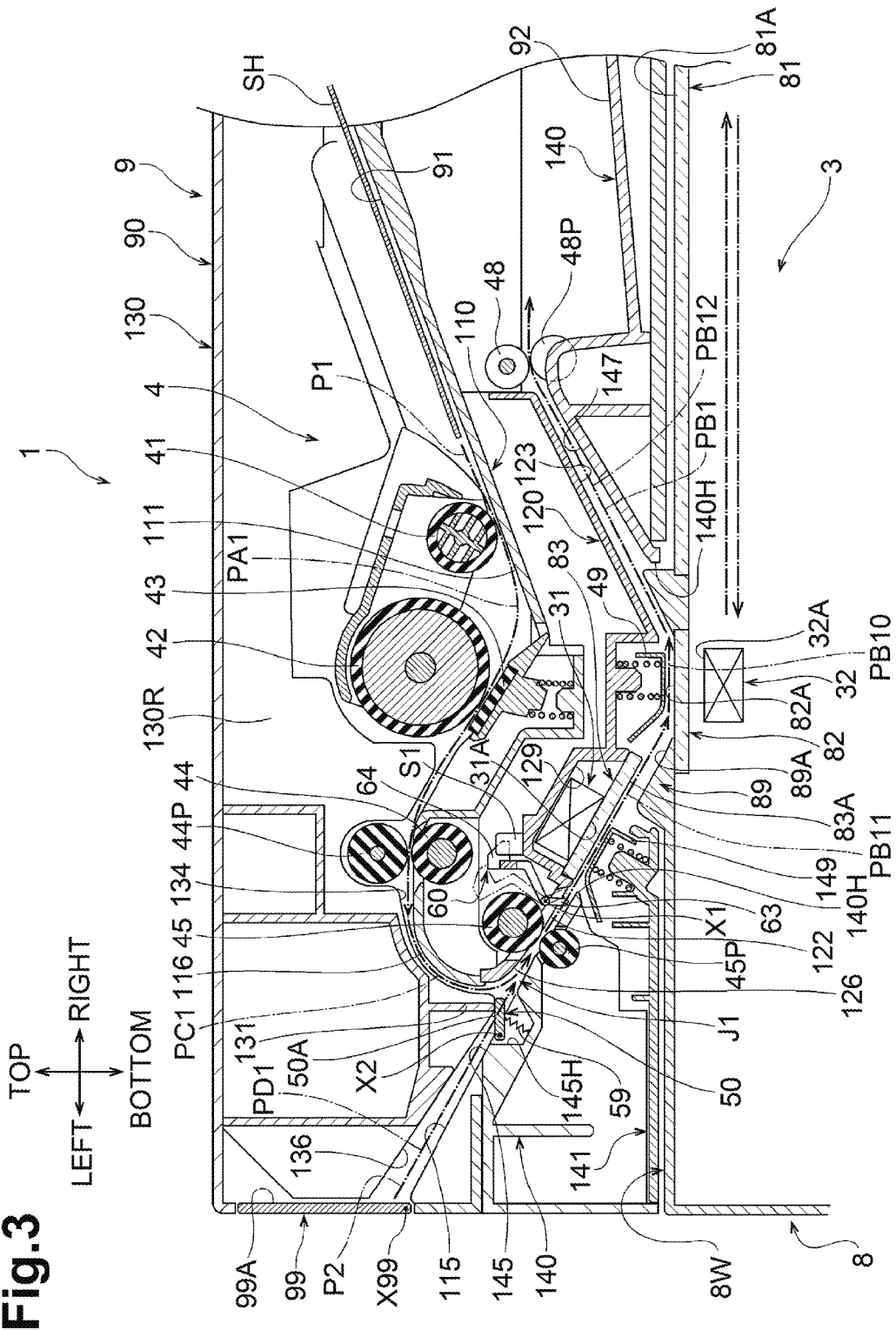
FIG. 3 is a schematic partial sectional view of the image reading apparatus in the first illustrative embodiment according to one or more aspects of the disclosure.

As illustrated in FIG. 3, the main unit 8 includes a first platen glass 81, a second platen glass 82, and a frame 8W, which define the top of the main unit 8.

The first platen glass 81 has an upper surface that serves as a document support surface 81A. The document support surface 81A is configured to, when the reading device 3 reads an image from a stationary document, support the document from below. The stationary document includes a book as well as a sheet, such as paper and an overhead projector sheet.

The second platen glass 82 is disposed to the left of the first platen glass 81 and extends in the front-rear direction. The second platen glass 82 has an upper surface that serves as a reading guide surface 82A. The reading guide surface 82A is configured to, when the reading device 3 reads an image from a moving sheet SH being conveyed by the conveying device 4, one by one, direct and support the moving sheet SH from below.

In the first illustrative embodiment, hereinafter, a read object from which an image is read via the document support surface 81A may be referred to as a document, and a read object from which an image is read while being conveyed by the conveying device 4 may be referred to as a sheet. The document and the sheet may be substantially the same object.

The frame 8W surrounds edges of the first platen glass 81 and the second platen glass 82. As illustrated in FIG. 3, the frame 8W includes a guide portion 89 adjacent to a left end of the second platen glass 82. The guide portion 89 protrudes upward from an upper surface of the frame 8W and extends in the front-rear direction. An upwardly-facing surface of the guide portion 89 includes an inclined surface 89A that is inclined downward toward its right end from its left end. That is, the inclined surface 89A is inclined downwardly rightward toward the reading guide surface 82A.

As illustrated in FIG. 1, the openable unit 9 includes a housing 90 having a substantially box shape. The housing 90 has a substantially box-shaped portion at its left portion. As illustrated in FIG. 3, the housing 90 accommodates the conveying device 4 in its left portion. As illustrated in FIG. 1, a right portion of the housing 90 has lower height than the left portion of the housing 90. The housing 90 includes a discharge tray 92 that may be an upper surface of the right portion the housing 90. The housing 90 further includes a feed tray 91 above the discharge tray 92. The feed tray 91 extends rightward from the left portion of the housing 90.

The openable unit 9 is supported by a hinge (not illustrated) disposed adjacent to an upper end of a rear surface of the main unit 8 so as to be pivotable on a pivot axis X9 that extends in the right-left direction. As illustrated in FIGS. 1 to 6, in a state where the openable unit 9 is closed, the openable unit 9 covers the document support surface 81A from above. In response to pivoting of the openable unit 9 on the pivot axis X9 such that a front end portion of the openable unit 9 moves upwardly rearward, the openable unit 9 exposes the document support surface 81A. In the state where the openable unit 9 exposes the document support surface 81A, a user is allowed to place a document to be read on the document support surface 81A.

For describing the external and internal configuration of the openable unit 9, the top-bottom direction and the front-rear direction may be defined with reference to the closed openable unit 9.

As illustrated in FIGS. 2 and 3, the reading device 3 includes a first reading unit 31 and a second reading unit 32. The first reading unit 31 is disposed in the openable unit 9, and the second reading unit 32 is disposed in the upper portion of the main unit 8. A known image sensor, for example, a contact image sensor ("CIS") or a charge-coupled device ("CCD"), may be used for each of the first and second reading units 31 and 32.

The first reading unit 31 has a substantially rectangular parallelepiped external shape. The first reading unit 31 has a first reading surface 31A extending in a main scanning direction. The second reading unit 32 also has a substantially rectangular parallelepiped external shape. The second reading unit 32 has a second reading surface 32A extending in the main scanning direction.

As illustrated in FIG. 3, in the first illustrative embodiment, the first reading unit 31 is disposed such that the first reading surface 31A faces diagonally downward and its main scanning direction extends along the front-rear direction. The second reading unit 32 is disposed such that the second reading surface 32A faces upward and its main scanning direction extends along the front-rear direction. The first reading surface 31A and the second reading surface 32A each include photoreceptor elements (not illustrated) arrayed in the main scanning direction.

The second reading unit 32 is disposed below the document support surface 81A and the reading guide surface 82A. The second reading unit 32 is connected to a scanning mechanism (not illustrated). In response to operation of the scanning mechanism controlled by the controller C1, the second reading unit 32 reciprocates along the right-left direction, which is a sub scanning direction orthogonal to the main scanning direction.

In a case where an image is read from a document supported by the document support surface 81A, the scanning mechanism reciprocates the second reading unit 32 in the right-left direction below the document support surface 81A. In a case where an image is read from a sheet SH being conveyed by the conveying device 4, the scanning mechanism causes the second reading unit 32 to stop at a stationary reading position below the reading guide surface 82A in the main unit 8.

The first reading unit 31 is disposed in the openable unit 9 together with the third platen glass 83. The third platen glass 83 is inclined relative to the first platen glass 81 and the second platen glass 82. More specifically, the third platen glass 83 is inclined downward toward its right end from its left end. The third platen glass 83 has an upwardly-facing surface that faces the first reading surface 31A. The third platen glass 83 has a downwardly-facing surface that serves as a reading guide surface 83A. The reading guide surface 83A is configured to, when the first reading unit 31 reads an image from a moving sheet SH being conveyed by the conveying device 4, direct and support the moving sheet SH from above.

As illustrated in FIGS. 2 and 3, the feed tray 91 is configured to support, from below, one or more sheets SH to be conveyed by the conveying device 4. The discharge tray 92 is configured to support one or more sheets SH whose images have been read by the first reading unit 31 and the second reading unit 32 and have been discharged by the conveying device 4.

Figure 7:
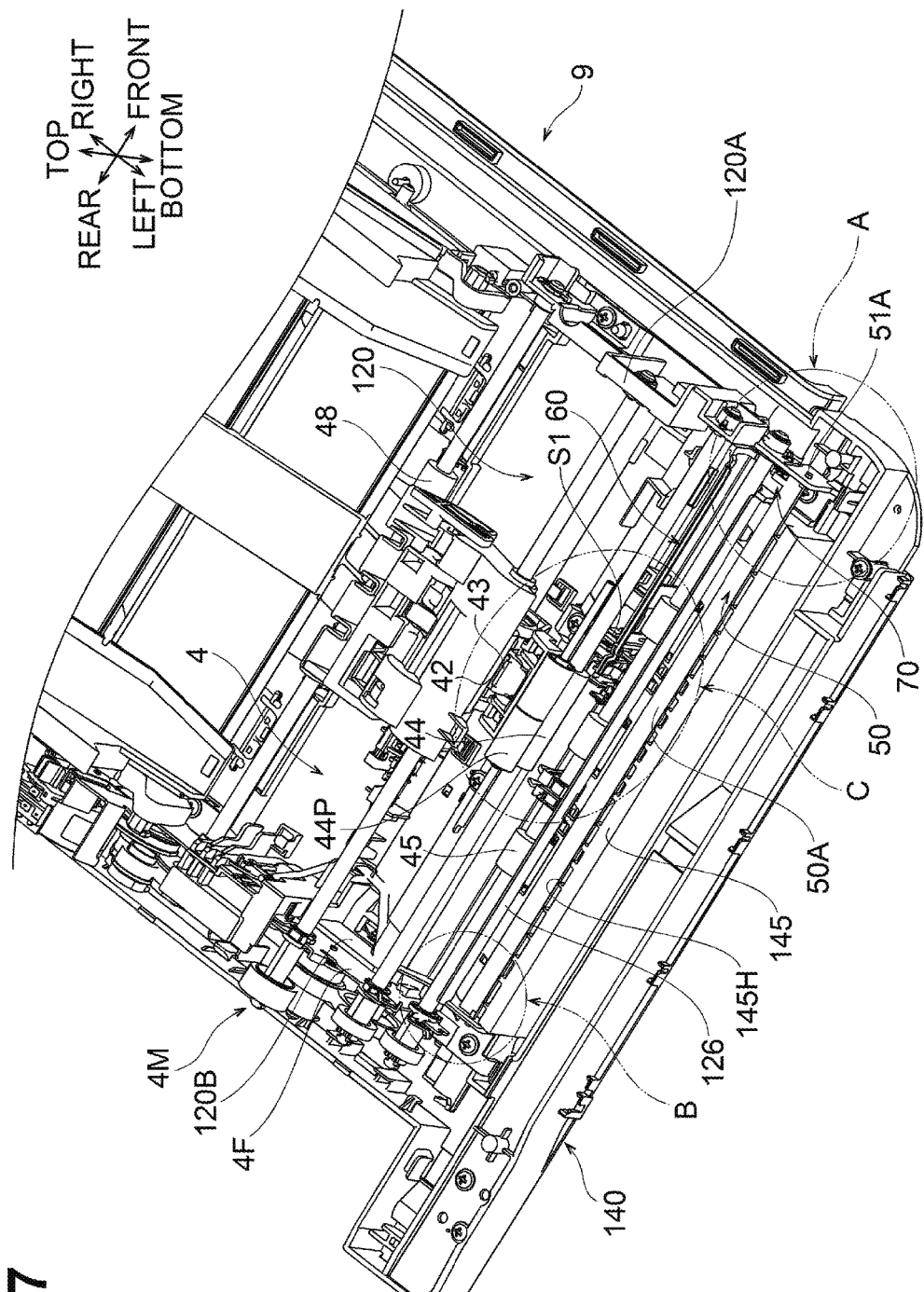
FIG. 7 is a partial perspective view of an openable unit in the first illustrative embodiment according to one or more aspects of the disclosure, wherein a first chute member and a first cover member are omitted.

As illustrated in FIG. 3, the conveying device 4 includes a first chute member 110, a second chute member 120, a first cover member 130, and a second cover member 140. As illustrated in FIG. 7, the conveying device 4 further includes a drive unit 4M. The drive unit 4M includes a motor and transmission gears supported by a sheet metal frame 4F. The sheet metal frame 4F is attached to the second cover member 140 while being positioned adjacent to a rear end of the second chute member 120. The drive unit 4M is configured to drive a feed roller 41, a separating roller 42, a first conveying roller 44, a second conveying roller 45, and a discharge roller 48.

Figure 5:
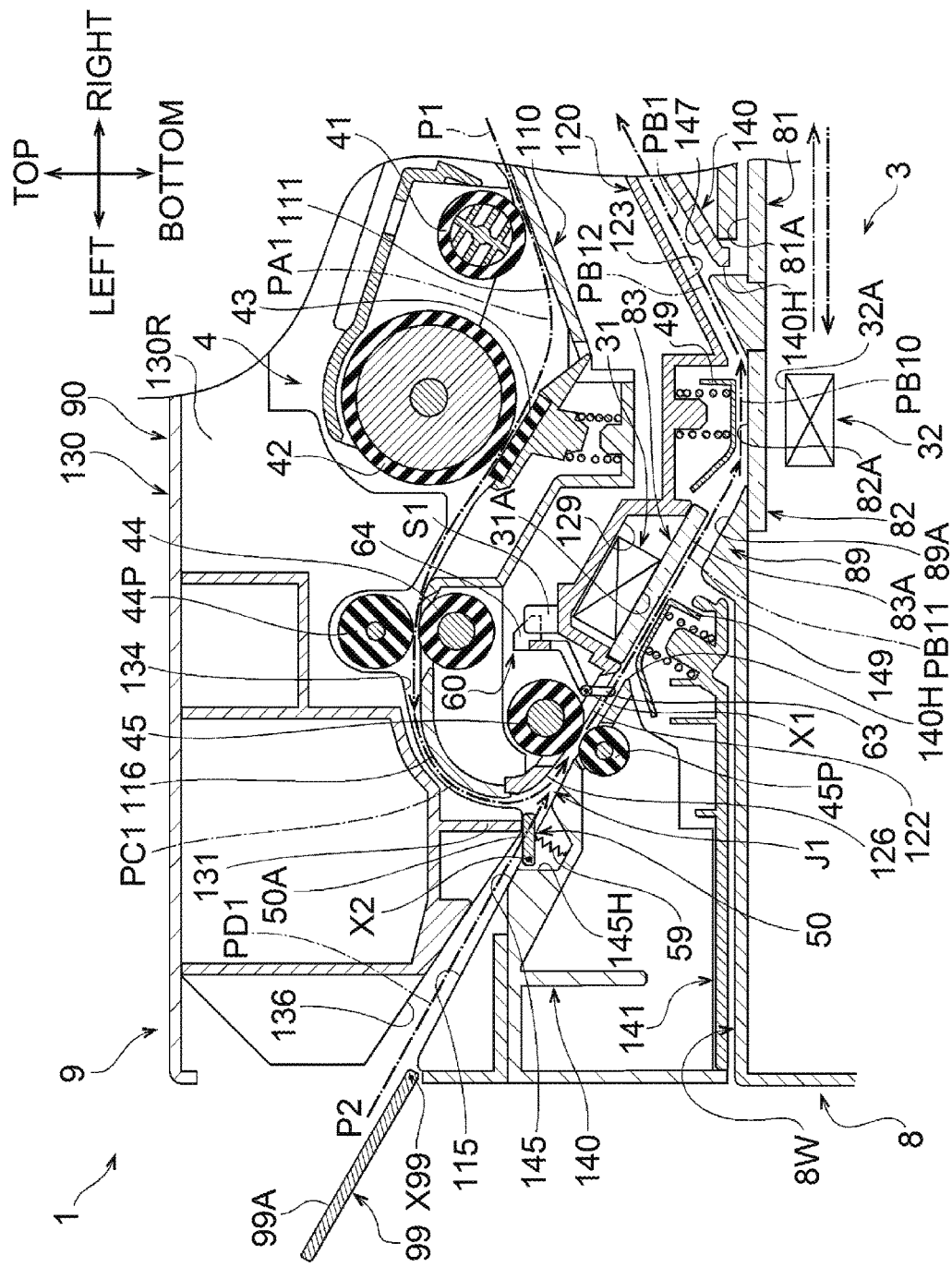
FIG. 5 is a schematic partial sectional view of the image reading apparatus in the first illustrative embodiment according to one or more aspects of the disclosure.
Figure 6:
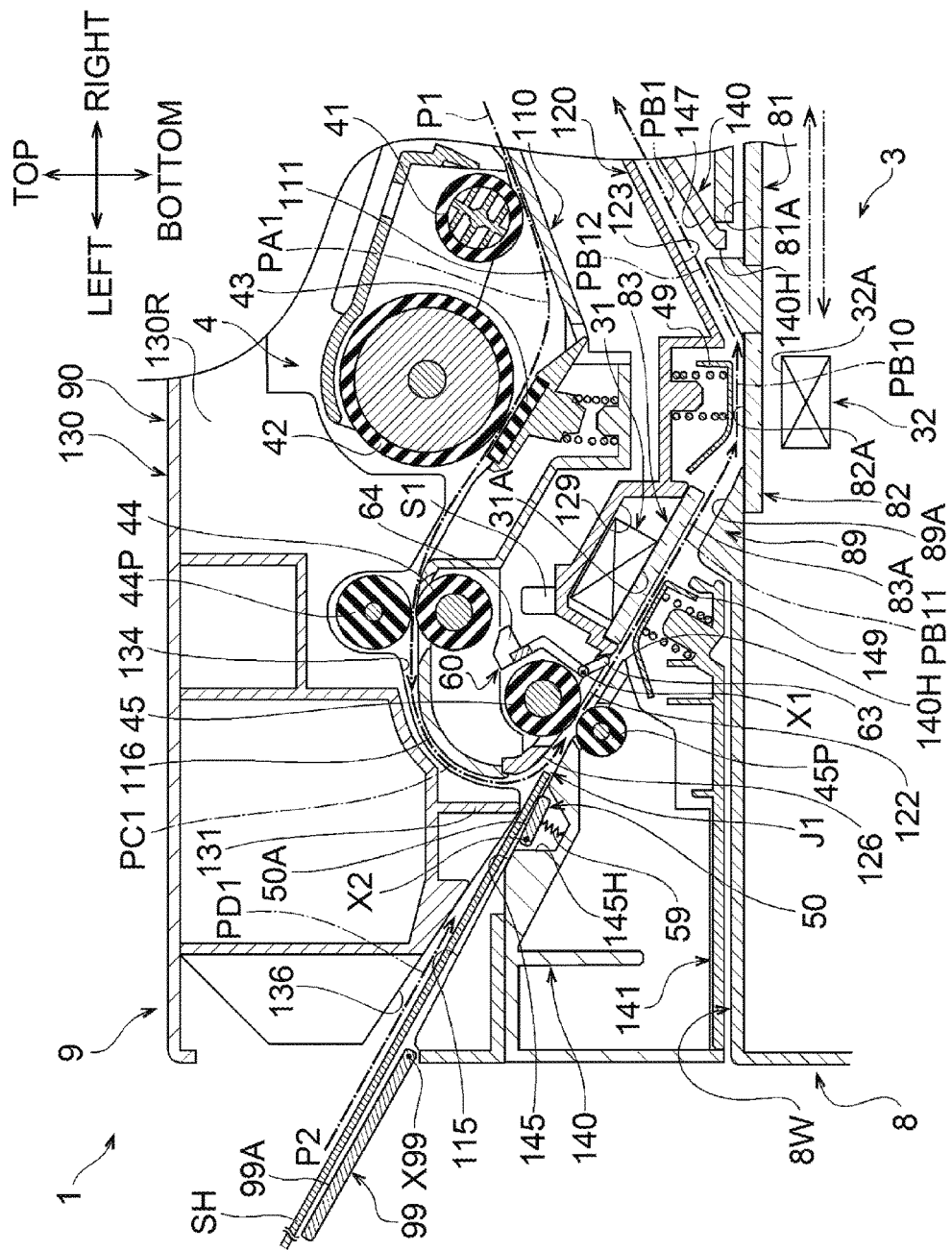
FIG. 6 is a schematic partial sectional view of the image reading apparatus in the first illustrative embodiment according to one or more aspects of the disclosure.

As illustrated in FIGS. 2, 3, 5, and 6, the conveying device 4 has a first conveying path P1 and a second conveying path P2. As illustrated in FIGS. 3, 5, and 6, each of the first conveying path P1 and the second conveying path P2 may be a space defined by upper and lower surfaces of the first chute member 110, the second chute member 120, the first cover member 130, and the second cover member 140. Each of the first conveying path P1 and the second conveying path P2 may also be defined by a plurality of guide surfaces, which extend so as to be contactable to one or the other side of a sheet SH in the openable unit 9.

More specifically, as illustrated in FIG. 3, the conveying device 4 has a first path portion PA1, a second path portion PB1, a third path portion PC1, and a fourth path portion PD1.

The third path portion PC1 is positioned at a left end portion of the openable unit 9 and a major section of the third path portion PC1 curves protruding toward the left.

The first path portion PA1 extends from the feed tray 91 to the vicinity of the left end portion of the openable unit 9. A left end (e.g., a downstream end) of the first path portion PA1 connects with an upper end (e.g., an upstream end) of the third path portion PC1. The first path portion PA1 includes a downwardly inclined section and an upwardly inclined section. The downwardly inclined section extends diagonally downward along the feed tray 91. The upwardly inclined section extends diagonally upward from a position between the feed roller 41 and the separating roller 42.

The second path portion PB1 is positioned below the first path portion PAL The second path portion PB1 connects with a lower end (e.g., a downstream end) of the third path portion PC1. The second path portion PB1 extends from the vicinity of the left end portion of the openable unit 9 to the discharge tray 92. The second path portion PB1 includes a downwardly inclined section, a horizontal section, and an upwardly inclined section. The downwardly inclined section extends from the vicinity of the left end portion of the openable unit 9 to the reading guide surface 82A. The horizontal section extends rightward along the reading guide surface 82A in the substantially horizontal direction. The upwardly inclined section extends from a right end (e.g., a downstream end) of the reading guide surface 82A toward the discharge tray 92.

The horizontal section, e.g., a predetermined section positioned below the third path portion PC1, is hereinafter referred to as a reference section PB10. That is, the second path portion PB1 includes a first inclined section PB11 (e.g., the downwardly inclined section), a second inclined section PB12 (e.g., the upwardly inclined section) that are inclined relative to the reference section PB10. The second reading surface 32A of the second reading unit 32 faces the reference section PB10 from below via the reading guide surface 82A of the second platen glass 82.

The first inclined section PB11 extends diagonally downward from the vicinity of the left end portion of the openable unit 9 toward the reading guide surface 82A in the second path portion PB1. That is, the first inclined section PB11 extends diagonally downward from the lower end (e.g., the downstream end) of the third path portion PC1 toward the reference section PB10.

The second inclined section PB12 extends diagonally upward from the right end (e.g., the downstream end) of the reading guide surface 82A toward the discharge tray 92 in the second path portion PB1.

The fourth path portion PD1 extends diagonally downward the from the left end portion of the openable unit 9. The fourth path portion PD1 meets the third path portion PC1 at a predetermined position that is a lower portion (e.g., a downstream portion) of the curved section of the third path portion PC1 and that is upstream from a junction J1 where the second path portion PB1 and the third path portion PC1 meet each other. The fourth path portion PD meets the third path portion PC1 so as to lead to the second path portion PB1. That is, the fourth path portion PD1 meets the third path portion PC1 at the predetermined junction J1 from the direction different from the direction that the first path portion PA1 meets the third path portion PC1, to thereby lead to the second path portion PB1.

The first conveying path P1 includes the first path portion PA1, the second path portion PB1, and the third path portion PC1, and extends from the first path portion PA1 to the second path portion PB1 via the third path portion PC1. The second conveying path P2 includes the second path portion PB1 and the fourth path portion PD1, and extends from the fourth path portion PD1 to the second path portion PB1.

The conveying device 4 is configured to convey a sheet SH through the first conveying path P1 and the second conveying path P2 selectively. The direction in which the conveying device 4 conveys a sheet SH along the first conveying path P1 may change. More specifically, for example, in the first path PA1, the sheet conveying direction may be a leftward direction. In the third path portion PC1, the sheet conveying direction may be the leftward direction and then change to a rightward direction. In the second path portion PB1, the sheet conveying direction may be the rightward direction. The direction in which the conveying device 4 conveys a sheet SH along the second conveying path P2 may be the rightward direction in both of the fourth path portion PD1 and the second path portion PB1. In the first illustrative embodiment, a width direction of a sheet SH to be conveyed by the conveying device 4 corresponds to the front-rear direction. Each of the first and second conveying paths P1 and P2 may extend in any direction and in any route.

The first chute member 110 has an upper surface that serves as a first guide surface 111 defining a portion of the first path portion PA1. The first guide surface 111 extends such that the first guide surface 111 may contact from below a sheet SH being conveyed along the first path portion PA1 and direct and support the sheet SH from below in the first path portion PA1.

The second chute member 110 has an upper curved surface 116 at its left end portion. The upper curved surface 116 defines an upper section (e.g., an upstream section) of the third path portion PC1. The upper curved surface 116 extends such that the upper curved surface 116 may contact from below and right a sheet SH being conveyed along the upper section of the third path portion PC1 and direct and support the sheet SH from below and right in the upper section of the third path portion PC1.

Figure 8:
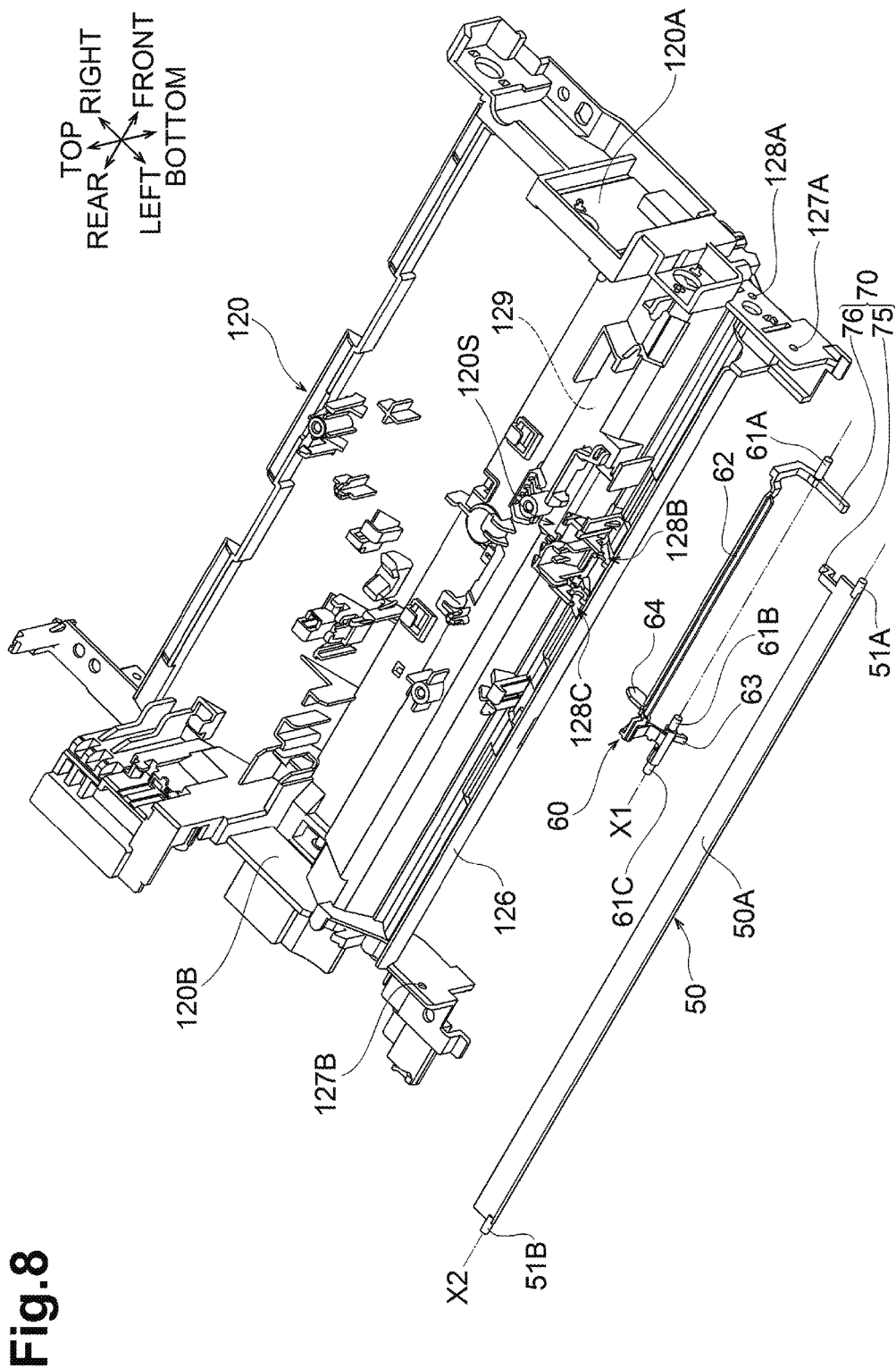
FIG. 8 is a disassembled perspective view of a second chute member, a shutter, and an actuator in the first illustrative embodiment according to one or more aspects of the disclosure.

As illustrated in FIGS. 3 and 7, the second chute member 120 is disposed below the first chute member 110 and is fastened to the second cover member 140 together with the first chute member 110 using a fastening member, e.g., a screw. As illustrated in FIG. 8, the second chute member 120 has recesses, protrusions, and mounting holes, which are used for attaching thereto various components including, for example, a detection sensor S1 and an actuator 60, at an upper surface of the second chute member 120. The second chute member 120 has a front wall 120A at its front end. The second chute member 120 has a rear wall 120B at its rear end. The front wall 120A and the rear wall 120B each extend in both the top-bottom direction and the front-rear direction. Each of the front wall 120A and the rear wall 120B has a left end that protrudes leftward relative to the other portions of the second chute member 120.

As illustrated in FIG. 3, the second chute member 120 has a lower curved surface 126 at its left end portion. The lower curved surface 126 defines a lower section (e.g., a downstream section) of the third path portion PC1. The lower curved surface 126 extends such that the lower curved surface 126 may contact from right and above a sheet SH being conveyed along the lower section of the third path portion PC1 and support and guide the sheet SH from right and above in the lower section of the third path portion PC1.

The second chute member 120 has a lower surface, which is contiguous to the lower curved surface 126 and a portion of which is inclined downward toward the right. The downwardly-inclined portion of the lower surface of the second chute member 120 serves as a second guide surface 122 that defines the first inclined section PB11 of the second path portion PB1. The second guide surface 122 extends such that the second guide surface 122 may contact from above a sheet SH being conveyed along the first inclined section PB11 and direct and support the sheet SH from above in the first inclined section PB11. The second guide surface 122 is an example of an upper guide surface.

The second chute member 120 includes an accommodating portion 129 that is recessed upward relative to the lower surface of the second chute member 120. The accommodating portion 129 may be a substantially rectangular parallelepiped space and extend in the front-rear direction. The first reading unit 31 is retained inside the accommodating portion 129. The accommodating portion 129 is closed by the third platen glass 83. The first reading unit 31 held by the accommodating portion 129 is disposed between the first path portion PA1 and the first inclined section of the second path portion PB1.

The reading guide surface 83A of the third platen glass 83 is inclined downward toward the right along the first inclined section PB11. The reading guide surface 83A defines the first inclined section PB11 in cooperation with the second guide surface 122. The first reading surface 31A of the first reading unit 31 extends parallel to the reading guide surface 83A of the third platen glass 83. That is, the first reading surface 31A is inclined downward along the first inclined section PB11. The first reading surface 31A of the first reading unit 31 faces the first inclined section PB11 through the reading guide surface 83A of the third platen glass 83.

The second chute member 120 holds a sheet presser 49 at its lower surface. The sheet presser 49 is offset from the right end (e.g., the downstream end) of the third platen glass 83 and faces the reading guide surface 82A from above.

The sheet presser 49 is urged toward the reading guide surface 82A by a compression coil spring. The sheet presser 49 has a lower surface that defines the reference section PB10 of the second path portion PB1. The lower surface of the sheet presser 49 extends such that the lower surface of the sheet presser 49 may contact from above a sheet SH being conveyed along the reference section PB10 and direct and support the sheet SH from above in the reference section PB10.

The lower surface of the second chute member 120 further include a portion that is inclined upward toward the right from the vicinity of the right end (e.g., the downstream end) of the sheet presser 49. The upwardly-inclined portion of the lower surface of the second chute member 120 serves as a third guide surface 123 that defines the second inclined portion PB12 of the second path portion PB1. The third guide surface 123 extends such that the third guide surface 123 may contact from above a sheet SH being conveyed along the second inclined section PB12 and direct and support the sheet SH from above in the second inclined section PB12.

The first cover member 130 is attached to the first chute member 110 from above. The first cover member 130 has a plurality of ribs 130R at its lower surface. The first cover member 130 has a fourth guide surface 134 that is defined by particular portions of lower ends of the ribs 130R. The fourth guide surface 134 defines the first path portion PA1 and the upper section (e.g., upstream section) of the third path portion PC1. The fourth guide surface 134 extends such that the fourth guide surface 134 may contact from above a sheet SH being conveyed along the first path portion PA1 and direct and support the sheet SH from above in the first path portion PA1. The fourth guide surface 134 extends such that the fourth guide surface 134 may contact from above and left a sheet SH being conveyed along the upper section (e.g., upstream section) of the third path portion PC1 and direct and support the sheet SH from above and left in the upper section of the third path portion PC1. The first cover member 130 is pivotably supported by the housing 90 of the openable unit 9 via a pivot shaft (not illustrated). The openable unit 9 may be exposed by upward pivoting of the first cover member 130 to expose the first conveying path P1. In this state, a paper jam may be cleared.

Figure 4:
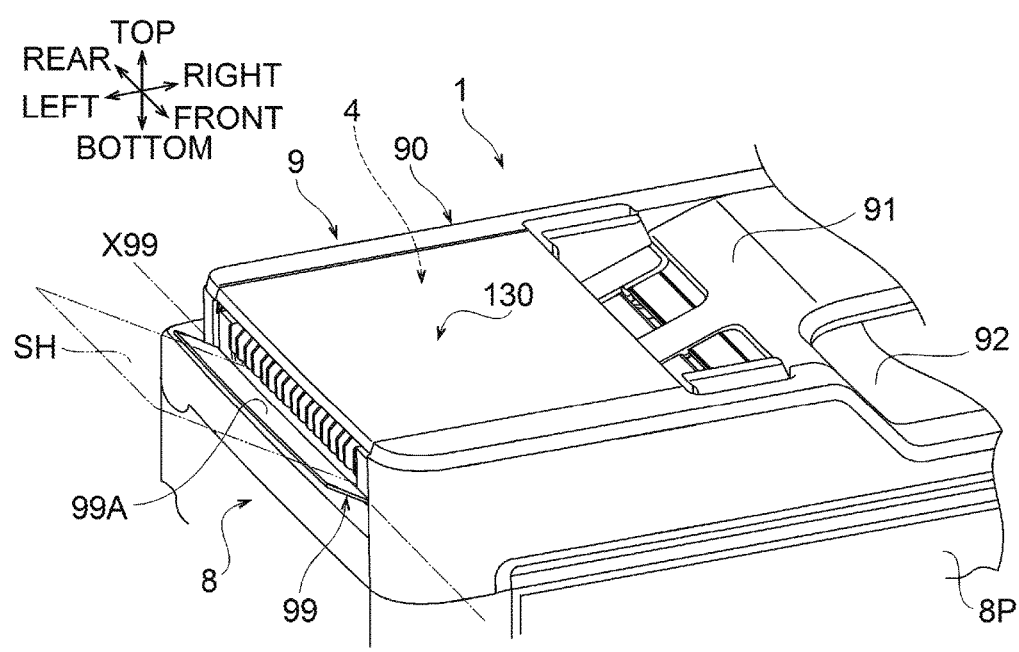
FIG. 4 is a partial perspective view of the image reading apparatus in the first illustrative embodiment according to one or more aspects of the disclosure.

As illustrated in FIGS. 4 and 5, a portion of the left sidewall of the openable unit 9 is constituted by a cover portion 99. The cover portion 99 is supported by the housing 90 of the openable unit 9 so as to be pivotable on a pivot axis X99 that extends in the front-rear direction. The pivot axis X99 is located at a lower end portion of the cover portion 99, which enables an upper end portion of the cover portion 99 to be movable. Thus, the cover portion 99 is movable between a closed position (refer to FIGS. 1 and 3) and an open position (refer to FIGS. 4, 5, and 6).

When the cover portion 99 is located at the closed position (refer to FIGS. 1 and 3), the cover portion 99 serves as the portion of the left sidewall of the openable unit 9. In this state, the cover portion 99 conceals an upstream end of the fourth path portion PD1.

When the cover portion 99 is located at the open position (refer to FIGS. 4, 5, and 6), the cover portion 99 exposes the upstream end of the fourth path portion PD1. The cover portion 99 has a support surface 99A. The support surface 99A faces upward when the cover portion 99 is located at the open position. As illustrated in FIG. 6, the support surface 99A is configured to support from below a sheet SH to be inserted into the fourth path portion PD1. The support surface 99A serves as an insertion guide for guiding the sheet SH into the fourth path portion. The support surface 99A has a dimension in the front-rear direction longer than the width of the sheet SH.

The sheet SH illustrated in FIG. 6 may be substantially the same as the sheet SH illustrated in FIG. 3. A sheet SH conveyed along the second conveying path P2 is less warped than a sheet SH conveyed along the first conveying path P1. Therefore, the sheet SH of FIG. 6 may have a greater thickness than the sheet SH of FIG. 3. In the first illustrative embodiment, the conveying device 4 does not include a sheet separating mechanism at the upstream end of the fourth path PD1. Therefore, only a single sheet SH is allowed to be inserted into the fourth path portion PD1 at a time.

The second cover member 140 is a relatively large component and extends both in the front-rear direction and in the right-left direction. The second cover member 140 supports both of the first chute member 110 and the second chute member 120 from below. As illustrated in FIG. 3, the second cover member 140 includes the discharge tray 92 that may be an upper surface of a right portion of the second cover member 140.

As illustrated in FIG. 3, the second cover member 140 has an opening 140H that penetrates therethrough in the top-bottom direction. The opening 140H may have a substantially rectangular shape. The opening has a size that allows the reading guide surface 83A of the third platen glass 83 and the sheet presser 49 to be exposed therethrough.

The second cover member 140 has a downstream fifth guide surface 145 further to the left than the opening 140H (e.g., upstream from the opening 140H in the second path portion PB1). A right end portion (e.g., an downstream end portion) of the downstream fifth guide surface 145 faces the lower curved surface 126 from below and defines the lower section of the third path portion PC1. The right end portion of the downstream fifth guide surface 145 extends such that right end portion of the downstream fifth guide surface 145 may contact from below a sheet SH being conveyed along the lower section of the third path portion PC1 and direct and support the sheet SH from below in the lower section of the third path portion PC1 and in the first inclined section PB11 of the second path portion PB1.

The downward fifth surface 145 is inclined upward from its right end (e.g., its downstream end) toward the left end of the openable unit 9. The first chute member 110 has an upstream fifth guide surface 115 that is contiguous to the left end of the downstream fifth guide surface 145. The upstream fifth guide surface 115 is inclined upward from the vicinity of the left end of the downstream fifth guide surface 145 toward the left end of the openable unit 9. A left end (e.g., an upstream end) of the upstream fifth guide surface 115 is positioned adjacent to the pivot axis X99 of the cover portion 99. The upstream fifth guide surface 115 and the downstream fifth guide surface 145 are an example of a lower guide surface. The upstream fifth guide surface 115 and the downstream fifth guide surface 145 extend such that the upstream fifth guide surface 115 and the downstream fifth guide surface 145 may each contact from below a sheet SH being conveyed along the fourth path portion PD1 and direct and support the sheet SH from below in the fourth path portion PD1.

The first cover member 130 has a sixth guide surface 136 that is defined by other particular portions of the lower ends of the ribs 130R. More specifically, for example, the particular portions of the lower ends of the ribs 130R are positioned further to the left than the fourth guide surface 134. The sixth guide surface 136 is inclined upward toward the left end of the openable unit 9 while facing the upstream fifth guide surface 115 and the left portion of the downstream fifth guide surface 145 from above. The sixth guide surface 136 extends such that the sixth guide surface 136 may contact from above a sheet SH being conveyed along the fourth path portion PD1 and direct and support the sheet SH from above in the fourth path portion PD1. The upstream end of the fourth path portion PD1, i.e., the end of the fourth path portion PD1 close to the cover portion 99, has a largest gap between the sixth guide surface 136 and the upstream fifth guide surface 115 and the left portion of the downstream fifth guide surface 145 in the top-bottom direction. This configuration may therefore enable easy insertion of a sheet SH into the fourth path portion PD1.

The first cover member 130 includes a partition rib 131 that defines the left end of the fourth guide surface 134 and the right end of the sixth guide surface 136. The partition rib 131 extends in the front-rear direction and protrudes downward while intersecting the ribs 130R. The partition rib 131 has a lower end extending in the front-rear direction. A length of the lower end of the partition rib 131 is greater than the width of a sheet SH to be inserted into the fourth path portion PD1.

The second cover member 140 has a seventh guide surface 147 further to the right than the opening 140H (e.g., downstream from the opening 140H in the second path portion PB1). The seventh guide surface 147 defines the second inclined section PB12 of the second path portion PB1. The seventh guide surface 147 extends such that the seventh guide surface 147 may contact from below a sheet SH being conveyed along the second inclined section PB12 of the second path portion PB1 and direct and support the sheet SH from below in the second inclined section PB12 of the second path portion PB1.

A holding member 141 is attached to the lower surface of the left end portion of the conveying device 4. The holding member 141 holds a sheet presser 149. The sheet presser 149 is disposed adjacent to the right end (e.g., the downstream end) of the downstream fifth guide surface 145 and faces the first reading surface 31A of the first reading unit 31 from below. The sheet presser 149 is urged toward the reading guide surface 83A by a compression coil spring.

In a state where the openable unit 9 is closed, an upper surface of the sheet presser 149 and the inclined surface 89A of the frame 8W are inclined downward toward the right along the first inclined section PB11. The upper surface of the sheet presser 149 faces the third platen glass 83 and defines the first inclined section PB11 in cooperation with the inclined surface 89A. The upper surface of the sheet presser 149 extends such that the upper surface of the sheet presser 149 may contact from below a sheet SH moving along the first inclined section PB11 and direct and support the sheet SH from below in the first inclined section PB11 of the second path portion PB1. The sheet presser 149 urged by the compression coil spring is configured to press a sheet SH being conveyed by the conveying device 4, toward the third platen glass 83.

In the state where the openable unit 9 is closed, the opening 140H is located vertically above the reading guide surface 82A to allow the reading guide surface 82A and the sheet presser 49 to face each other. Thus, the reading guide surface 82A defines the reference section PB10 of the second path portion PB1. The reading guide surface 82A extends such that the reading guide surface 82A may contact from below a sheet SH being conveyed along the reference section PB10 and direct and support the sheet SH from below in the reference section PB10.

The section from the fourth path portion PD1 to the vicinity of the first and second reading surfaces 31A and 32A in the second path portion PB1, i.e., the fourth path portion PD1 and the first inclined section PB11, are defined to be substantially straight by the upstream fifth guide surface 115, the downstream fifth guide surface 145, the sixth guide surface 136, the second guide surface 122, the reading guide surface 83A, the sheet presser 149, and the inclined surface 89A.

The conveying device 4 includes the feed roller 41, the separating roller 42, and a separating member 43. The feed roller 41 is disposed adjacent to the feed tray 91.

The feed roller 41 and the separating roller 42 are disposed facing the first guide surface 111 of the first chute member 110 from above. The separating member 43 defines a sheet conveying surface in cooperation with the upper surface of the first chute member 110. The separating member 43 is disposed facing the separating roller 42 from below. The separating member 43 may be a plate-shaped member made of soft material, e.g., rubber or elastomer. The separating member 43 is pressed against the separating roller 42 by an urging spring.

The feed roller 41 and the separating roller 42 are configured to rotate in synchronization with each other. The feed roller 41 is configured to apply a conveying force to one or more sheets SH supported by the feed tray 91 to feed the one or more sheets SH toward the separating roller 42. The separating roller 42 is configured to rotate in contact with the one or more sheets SH fed into the first path portion PA1 from the feed tray 91 to convey the one or more sheets SH toward the third path portion PC1. The separating member 43 is configured to separate a single sheet SH from the one or more sheets SH conveyed by the separating roller 42 in cooperation with the separating roller 42.

The conveying device 4 further includes a first conveying roller 44, a pinch roller 44P, a second conveying roller 45, a pinch roller 45P, a discharge roller 48, and a pinch roller 48P.

The first conveying roller 44 and the pinch roller 44P are disposed downstream from the separating roller 42 and the separating member 43 in the first path portion PA1. The first conveying roller 44 and the pinch roller 44P are configured to nip the single sheet SH separated by the separating roller 42 and the separating member 43 and convey the sheet SH toward the third path portion PC1.

The second conveying roller 45 and the pinch roller 45P are disposed at a junction where the third path portion PC1 meets the second path portion PB1. The second conveying roller 45 and the pinch roller 45P are configured to nip the sheet SH being conveyed by the first conveying roller 44 and the pinch roller 44P and convey the sheet SH further downstream in the second path portion PB1. As illustrated in FIG. 6, the second conveying roller 45 and the pinch roller 45P are configured to convey a sheet SH inserted into the fourth path portion PD1 and convey the sheet SH downstream in the second path portion PB1. The sheet SH nipped by the second conveying roller 45 and the pinch roller 45P is conveyed toward the first reading unit 31, which is disposed parallel to the first inclined section PB11, and the second reading unit 32, which has stopped at the stationary reading position and faces the reference section PB10. Meanwhile, the sheet presser 149 reduces or prevents the sheet SH being conveyed from separating from the reading guide surface 83A. The sheet presser 49 also reduces or prevents the sheet SH being conveyed from separating from the reading guide surface 82A.

As illustrated in FIG. 3, the discharge roller 48 and the pinch roller 48P are disposed at a downstream end of the second inclined portion PB12 of the second path portion PB1. The discharge roller 48 is disposed adjacent to a right end (e.g., a downstream end) of the third guide surface 123. The pinch roller 48P is disposed adjacent to a right end (e.g., a downstream end) of the seventh guide surface 147. The discharge roller 48 and the pinch roller 48P are configured to nip the sheet SH that has passed above the reading guide surface 82A and discharge the sheet SH onto the discharge tray 92.

<Configuration of Shutter, Detection Sensor, Actuator, and Transmission Mechanism>

As illustrated in FIGS. 3, and 5 to 14, the image reading apparatus 1 further includes a shutter 50 and a transmission mechanism 70 as well as the detection sensor S1 and the actuator 60.

As illustrated in FIG. 8, the shutter 50 may be a substantially elongated plate member that extends in the front-rear direction. The shutter 50 has a dimension in the front-rear direction longer than the width of a sheet SH to be inserted into the fourth path portion PD1. The shutter 50 includes shaft portions 51A and 51B and an actuating portion 75.

The shaft portion 51A has a substantially cylindrical body that extends frontward from a left front corner of the shutter 50. The shaft portion 51B has a substantially cylindrical body that extends rearward from a left rear corner of the shutter 50. The shaft portions 51A and 51B define a second axis X2 that extends in the front-rear direction.

Figure 9:
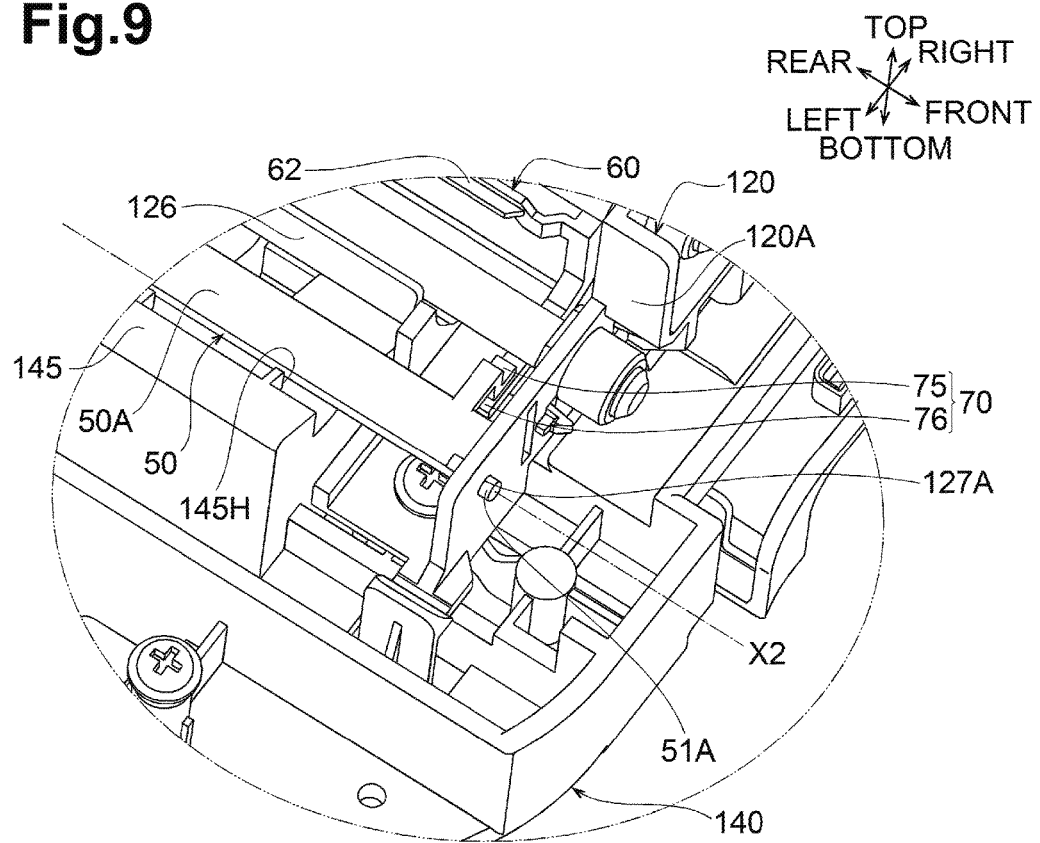
FIG. 9 is a partial perspective view of portion A of the openable unit of FIG. 7 in the first illustrative embodiment according to one or more aspects of the disclosure.
Figure 10:
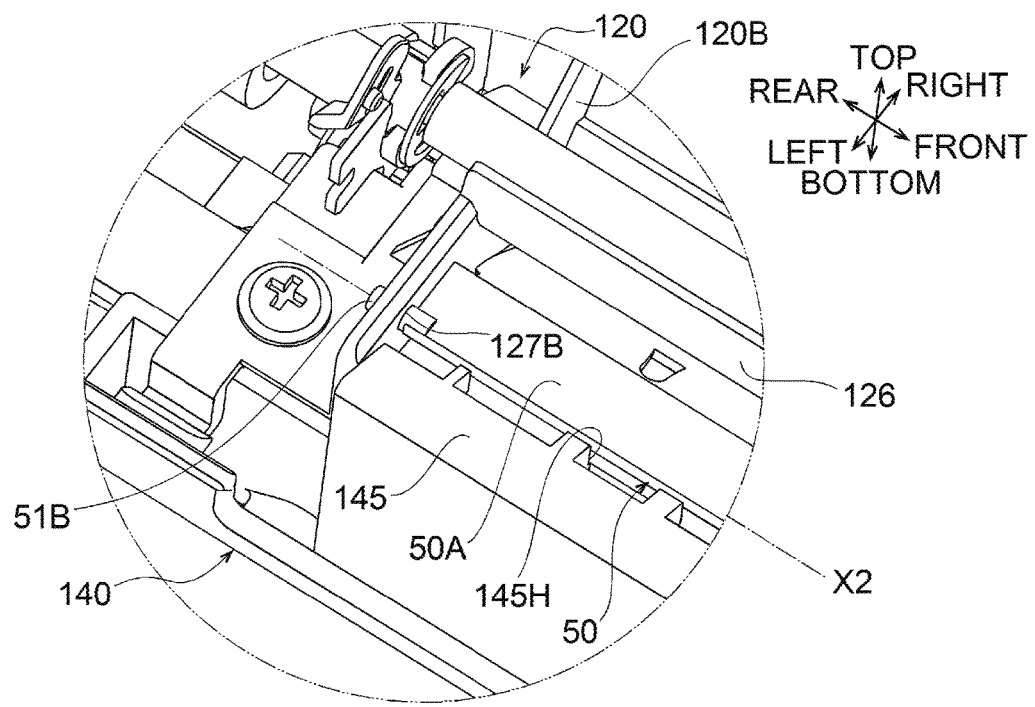
FIG. 10 is a partial perspective view of portion B of the openable unit of FIG. 7 in the first illustrative embodiment according to one or more aspects of the disclosure.

As illustrated in FIGS. 8 and 9, the front shaft portion 51A of the shutter 50 is rotatably supported by the support hole 127A that penetrates through the left end portion of the front wall 120A of the second chute member 120. As illustrated in FIGS. 8 and 10, the rear shaft portion 51B of the shutter 50 is rotatably supported by the support hole 127B that penetrates through the left end portion of the rear wall 120B of the second chute member 120. Thus, the shutter 50 is supported by the second chute member 120 so as to be pivotable on the second axis X2.

As illustrated in FIG. 8, the actuating portion 75 extends from a right end of the shutter 50. The actuating portion 75 extends rightward from the vicinity of a right front corner of the shutter 50. The actuating portion 75 further extends downward and then rightward. The actuating portion 75 constitutes a portion of the transmission mechanism 70.

As illustrated in FIG. 9, in a state where the shutter 50 is supported by the second chute member 120, the actuating portion 75 is located close to the front wall 120A of the second chute member 120. The actuating portion 75 is positioned further to the front than the downstream fifth guide surface 145 of the second cover member 140. That is, the actuating portion 75 is disposed in a sheet width direction outside an area where a sheet SH is to be conveyed by the conveying device 4.

As illustrated in FIGS. 5, 6, 7, 9, and 10, the second cover member 140 has a recessed portion 145H in the downstream fifth guide surface 145. The recessed portion 145H is recessed downward relative to the downstream fifth guide surface 145. The recessed portion 145H is positioned upstream from the junction J1 in the fourth path portion PD1. The recessed portion 145H has a length in the front-rear direction such that the recessed portion 145H is capable of accommodating the shutter 50 therein. The second axis X2 is spaced vertically downward from the downstream fifth guide surface 145 and located in the recessed portion 145H and adjacent to a left surface of the recessed portion 145H.

The shutter 50 is movable between a first position (refer to FIGS. 3, 5, 12, and 13) and a second position (refer to FIGS. 6 and 14) by pivoting on the second axis X2 such that a distal end, which is positioned downstream from the second axis X2 in the fourth path portion PD1, i.e., a right end, of the shutter 50 moves in the top-bottom direction.

The shutter 50 has an upper surface 50A. As illustrated in FIG. 5, when the shutter 50 is located at the first position, the right end protrudes from the recessed portion 145H beyond the downstream fifth guide surface 145 and the upper surface 50A of the shutter 50 contacts a lower end of the partition rib 131 to block the fourth path portion PD1.

As illustrated in FIG. 6, when the shutter 50 is located at the second position, the right end does not protrude from the recessed portion 145H beyond the downstream fifth guide surface 145 and the entirety of the shutter 50 is located in the recessed portion 145H while the upper surface 50A of the shutter 50 defines a portion of the downstream fifth guide surface 145. Thus, the shutter 50 unblocks or opens the fourth path portion PD1.

That is, the shutter 50 is configured to selectively blocks and unblocks the fourth path portion PD1 at a particular position upstream from the junction J1 in the fourth path portion PD1.

As illustrated in FIGS. 5 and 6, an urging spring 59 is disposed in the recessed portion 145H. The urging spring 59 is an example of an urging member. The urging spring 59 has a lower end retained at a bottom of the recessed portion 145H and an upper end retained at a lower surface of the shutter 50. This configuration may enable the urging spring 59 to urge the shutter 50 toward the first position (refer to FIG. 5).

As illustrated in FIG. 6, as a sheet SH is inserted into the fourth path portion PD1, the sheet SH contacts the shutter 50 to press the right end portion of the shutter 50 downward against an urging force of the urging spring 59. Thus, the shutter 50 moves from the first position (refer to FIG. 5) to the second position (refer to FIG. 6). When the shutter 50 moves to the second position from the first position, the shutter 50 urged by the urging spring 59 contacts the sheet SH to press the sheet SH against the lower end of the partition rib 131. While the conveying device 4 conveys the sheet SH in the fourth path portion PD1, the shutter 50 contacts the moving sheet SH to press the sheet SH against the lower end of the partition rib 131. Therefore, the sheet SH slides relative to the shutter 50. With this configuration, the second position of the shutter 50 varies depending on a thickness of a sheet SH to be inserted into the fourth path portion PD1. For example, when a relatively-thin sheet SH is inserted into the fourth path portion PD1, the shutter 50 may protrude partially from the recessed portion 145H beyond the downstream fifth guide surface 145. The degree of the urging force of the urging spring 59 is determined such that the shutter 50 does not cause bending of a leading edge of a sheet SH when the sheet SH is placed into the fourth path portion PD1, or such that the shutter 50 does not impart a resistance to conveyance of the sheet SH after the sheet SH is placed into the fourth path portion PD1.

Figure 11:
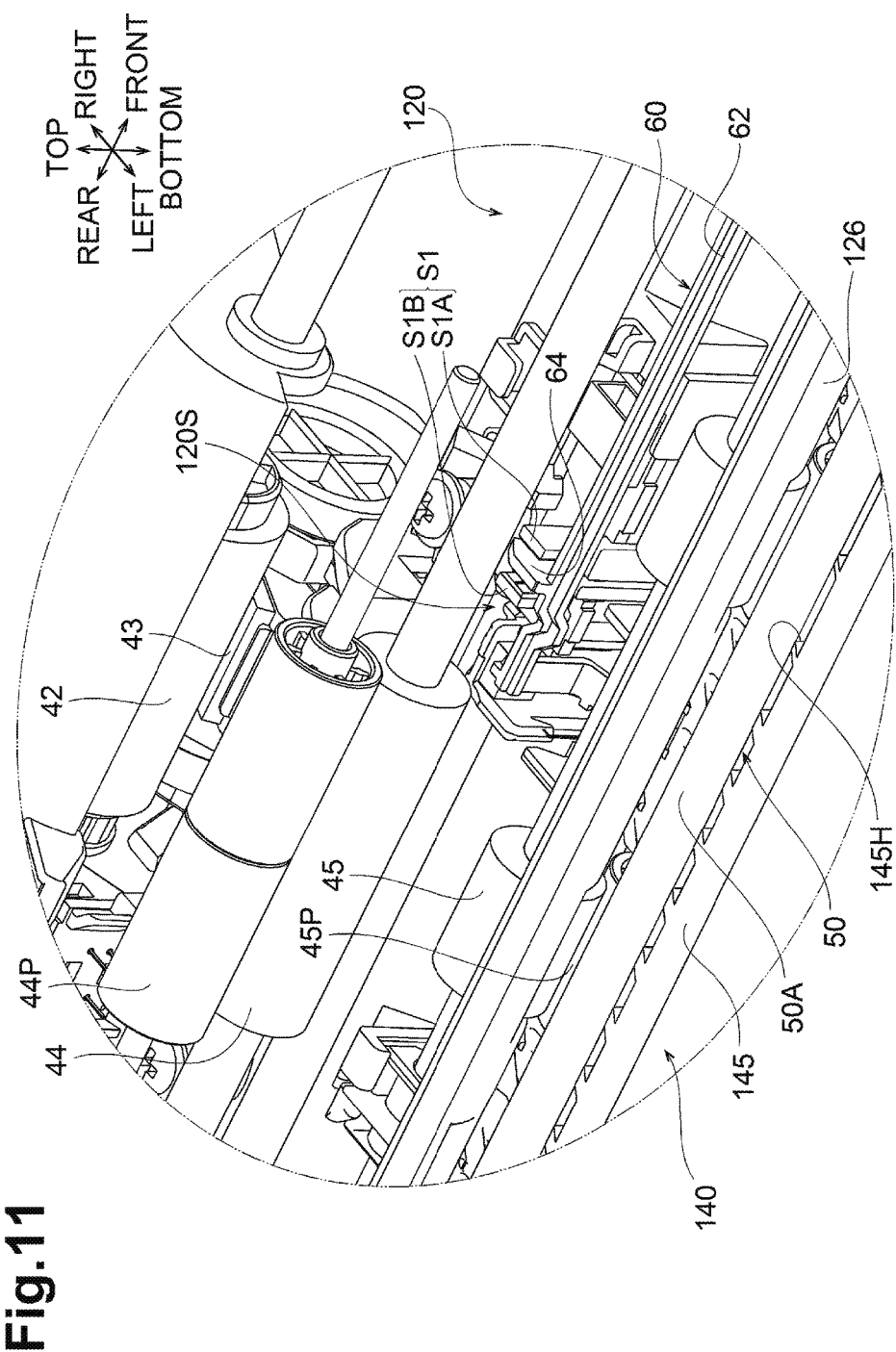
FIG. 11 is a partial perspective view of portion C of the openable unit of FIG. 7 in the first illustrative embodiment according to one or more aspects of the disclosure.

As illustrated in FIGS. 8 and 11, the detection sensor S1 is attached to a sensor mount 120S that is disposed at a middle portion of the upper surface of the second chute member 120 in the front-rear direction. As illustrated in FIG. 3, the detection sensor S1 is disposed upstream from the first and second reading units 31 and 32 in the second path portion PB1. In the first illustrative embodiment, the detection sensor S1 may be a photointerrupter. As illustrated in FIG. 11, the detection sensor S1 is configured to perform detection based on whether an optical path extending from a light emitting portion S1A to a light receiving portion S1B is blocked or unblocked, and transmit a detection signal to the controller C1 based on the detection result.

As illustrated in FIG. 8, the actuator 60 includes shaft portions 61A, 61B, and 61C, a connecting portion 62, a contactable portion 63, a blocking portion 64, and a passive portion 76.

The shaft portions 61A, 61B, and 61C each have a substantially cylindrical shape. The shaft portions 61A, 61B, and 61C define the first axis X1 that extends in the front-rear direction. The shaft portions 61B and 61C are contiguous to each other. The shaft portion 61A is spaced from the shaft portions 61B and 61C and is disposed further to the front than the shaft portions 61B and 61C. The connecting portion 62 includes a substantially straight portion, a front portion, and a rear portion. The substantially straight portion extends in the front-rear direction and is spaced from the first axis X1. The front portion extends from a front end of the substantially straight portion and further extends toward a different direction, and is contiguous to the shaft portion 61A. The rear portion extends from a rear end of the substantially straight portion and further extends toward a different direction. The rear portion connects the shaft portion 61B and the shaft portion 61C. The blocking portion 64 may be a small protrusion that protrudes rightward from the rear portion of the connecting portion 62. The contactable portion 63 may also be a small protrusion that protrudes downward from between the shaft portion 61B and the shaft portion 61C.

The second chute member 120 has a support hole 128A in a left end portion of the front wall 120A. The support hole 128A is positioned further to the right than the support hole 127A. The shaft portion 61A of the actuator 60 is rotatably supported by the support hole 128A although this configuration is not illustrated.

The second chute member 120 includes bearing portions 128B and 128C at its upper surface. The bearing portions 128B and 128C are located to the left of the sensor mount 120S. The shaft portion 128B includes a small component having an upwardly-recessed portion having a semicircular shape in cross section, and another small component having a downwardly-recessed portion having a semicircular in cross section. The shaft portion 128C has the same or similar configuration to the shaft portion 128B. The shaft portions 61B and 61C of the actuator 60 are rotatably supported by the bearing portions 128B and 128C, respectively, although this configuration is not illustrated.

Thus, the actuator 60 is supported by the second chute member 120 so as to be pivotable on the first axis X1. That is, the second chute member 120 may be used both as a member for supporting the shutter 50 movably and a member for supporting the actuator 60 pivotably.

As illustrated in FIG. 8, the passive portion 76 is contiguous to the front portion of the connecting portion 62 and a rear end of the shaft portion 61A of the actuator 60. The passive portion 76 protrudes leftward. The actuating portion 75 and the passive portion 76 constitutes the transmission mechanism 70.

Figure 12:
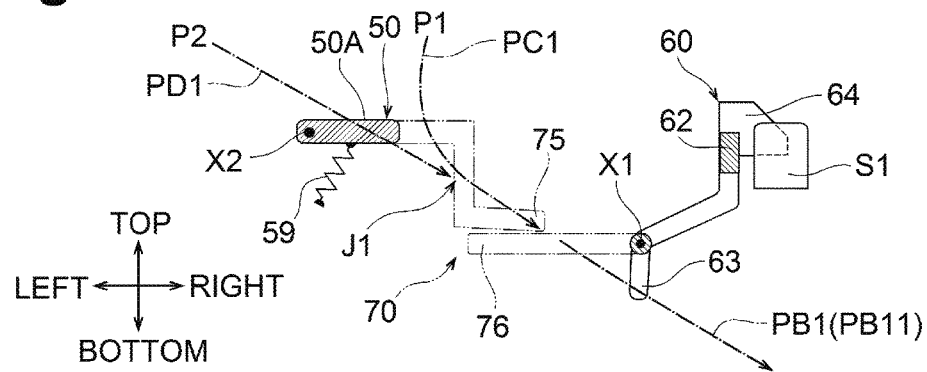
FIG. 12 is a schematic view for explaining how the shutter, the actuator, a transmission mechanism, and a detection sensor behave in the first illustrative embodiment according to one or more aspects of the disclosure.
Figure 13:
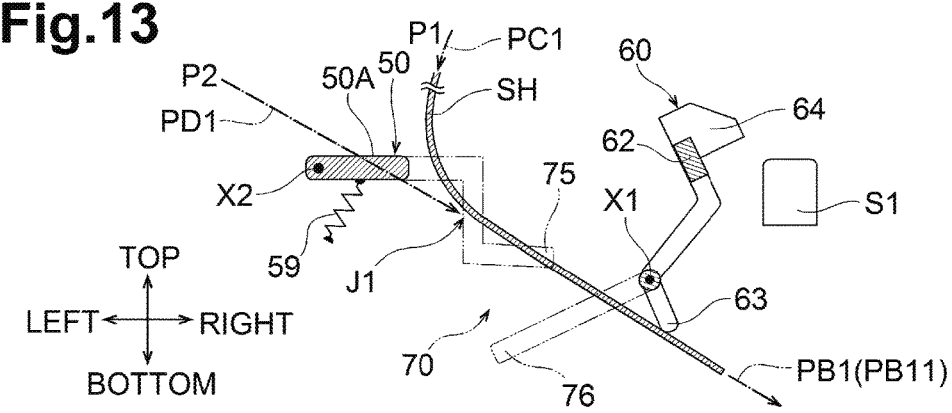
FIG. 13 is a schematic view for explaining how the shutter, the actuator, the transmission mechanism, and the detection sensor behave in the first illustrative embodiment according to one or more aspects of the disclosure.
Figure 14:
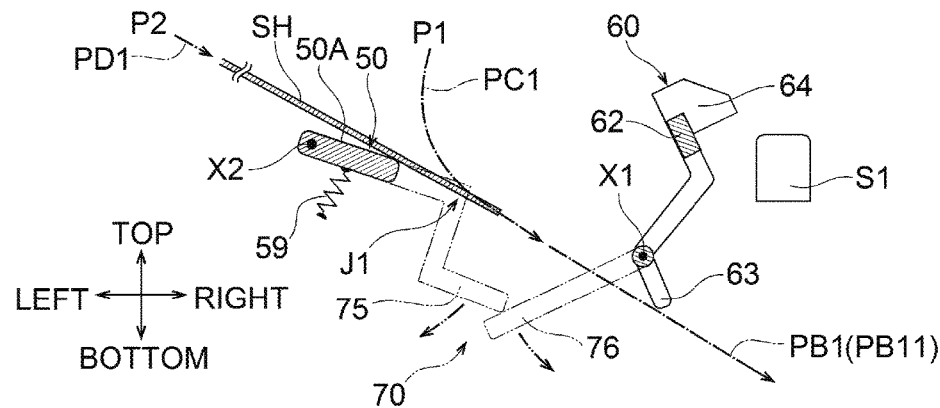
FIG. 14 is a schematic view for explaining how the shutter, the actuator, the transmission mechanism, and the detection sensor behave in the first illustrative embodiment according to one or more aspects of the disclosure.

As illustrated in FIG. 9, in a state where the actuator 60 is supported by the second chute member 120, the passive portion 76 is located adjacent to the front wall 120A of the second chute member 120 and extends to immediately below the actuating portion 75. Similar to the actuating portion 75, the passive portion 76 is positioned further to the front than the downstream fifth guide surface 145 of the second cover member 140. That is, the passive portion 76 is also disposed in the sheet width direction outside the area where a sheet SH is to be conveyed by the conveying device 4. As illustrated in FIGS. 12, 13, and 14, the actuating portion 75 and the passive portion 76 (both are illustrated by a double-dotted-and-dashed line) are positioned further to the front than the detection sensor S1, the contactable portion 63, and the blocking portion 64 of the actuator 76.

Thus, the actuator 60 is movable between a third position (refer to FIGS. 5, 11, 12, and 13) and a fourth position (refer to FIGS. 6 and 14) by pivoting on the first axis X1 such that a distal end, which is positioned downstream from the first axis X1 in the second path portion PB1, i.e., a lower end, of the actuator 60 moves in the right-left direction.

As illustrated in FIG. 5, in a state where the actuator 60 is located at the third position, the passive portion 76 is located immediately below the actuating portion 75 while being spaced from the actuating portion 75. The contactable portion 63 protrudes downward beyond the second guide surface 122 and intersects the first inclined section PB11 of the second path portion PB1. The blocking portion 64 is located between the light-emitting portion S1A and the light-receiving portion S1B of the detection sensor S1 to block the optical path. Thus, the detection sensor S1 detects that the actuator 60 is not located at the fourth position. The actuator 60 is urged toward the third position (refer to FIG. 5) by a twisted coil spring (not illustrated). The third position is associated with the first position of the shutter 50.

As illustrated in FIGS. 6 and 14, the actuator 60 moves to the fourth position in connection with movement of the shutter 50 from the first position to the second position. More specifically, as illustrated in FIG. 14, when the shutter 50 moves from the first position to the second position, the actuating portion 75 moves downward to contact and press the passive portion 76 downward in the transmitting mechanism 70. Thus, the actuator 60 moves from the third position (refer to FIG. 12) to the fourth position (refer to FIG. 14).

As illustrated in FIG. 14, in a state where the actuator 60 is located at the fourth position, the lower end of the contactable portion 63 is located further downstream of the second path portion PB1 and thus does not intersect the first inclined section PB11 of the second path portion PB1. The blocking portion 64 is not located between the light-emitting portion S1A and the light-receiving portion S1B of the detection sensor S1 to unblock the optical path. Thus, the detection sensor S1 detects that the actuator 60 is located at the fourth position. The fourth position is associated with the second position of the shutter 50.

As illustrated in FIG. 13, the actuator 60 is further configured to move to the fourth position independently of the shutter 50 in response to contact of the contactable portion 63 with a sheet SH moving along the first inclined section PB11 of the second path portion PB1. In this case, the detection sensor S1 detects also that the actuator 60 is located at the fourth position.

<Image Reading Operation>

In the image reading apparatus 1, in response to turning on of the power, the controller C1 generates correction data by reading a white reference and a black reference using the first reading unit 31. The controller C1 further generates correction data by reading another white reference and another black reference using the second reading unit 32. For example, the sheet presser 149 that faces the first reading unit 31 may have a white body. For reading the white reference, the first reading unit 31 reads the sheet presser 149 while tuning its light source on. For reading the black reference, the first reading device 31 reads the sheet presser 149 while tuning its light source off. Further, a white tape is adhered to a particular portion that is further to the left than the second platen glass 82 and faces the second reading surface 32A of the second reading unit 32. For reading the white reference, the second reading unit 32 reads the white tape while turning its light source on. For reading the black reference, the second reading device 32 reads the white tape while tuning its light source off. Nevertheless, in other embodiments, for example, such reading of the white references and the black references may be performed after the start of document reading is instructed.

For reading an image from a document supported by the document support surface 81A, the user places a document to be read on the document support surface 81A. Thereafter, in response to a user's input of an instruction to start an image reading operation on the operation panel 8P or via an information terminal connected to the image reading apparatus 1, the controller C1 starts an image reading operation.

The controller C1 executes control of the scanning mechanism of the reading device 3. This control causes the scanning mechanism to move the second reading unit 32 back and forth in the right-left direction between a reading start position and a reading end position. The reading start position may be located vertically below a left end of the document support surface 81A. The reading end position may be located vertically below a right end of the document support surface 81A. The controller C1 also executes control of the second reading unit 32. This control causes the second reading unit 32 to read an image from the document supported by the document support surface 81A. Subsequent to this, the controller C1 executes control of the scanning mechanism. This control causes the scanning mechanism to move the second reading unit 32 that has read the image from the document, from the right end to the left end in the reading device 3, to return the second reading unit 32 to a standby position.

In the image reading apparatus 1, one or more sheets SH placed on the feed tray 91 may be conveyed one by one by the conveying device 4 and an image may be read from each of the one or more sheets SH. In this case, as illustrated in FIG. 3, the user places one or more sheets SH to be read on the feed tray 91. Thereafter, in response to a user's input of an instruction to start a reading operation, for example, on the operation panel 8P, the controller C1 starts an image reading operation.

The controller C1 executes control of the scanning mechanism of the reading device 3. This control causes the scanning mechanism to move the second reading unit 32 to the stationary reading position that is located below the reading guide surface 82A, and stop the second reading unit 32 at the stationary reading position. The second reading surface 32A of the second reading unit 32 faces the reference section PB10 of the second path portion PB1 from below at the stationary reading position.

Subsequent to this, the controller C1 controls the drive portion 4M of the conveying device 4 to operate the conveying device 4. As the conveying device 4 conveys a single sheet SH of the one or more sheets SH successively along the first conveying path P1 from the feed tray 91, each sheet SH moves to the second path portion PB1 via the first path portion PA1 and the third path portion PC1. As illustrated in FIG. 13, the actuator 60 pivots from the third position to the fourth position in response to contact of the actuator 60 with the sheet SH in the second path portion PB1. Thus, the detection sensor S1 detects that the actuator 60 is located at the fourth position, and transmits a detection signal to the controller C1 based on the detection result. The controller C1 controls the first and second reading units 31 and 32 based on the detection signal. More specifically, the controller C1 executes control such that the first and second reading units 31 and 32 start a reading operation after a predetermined period of time has elapsed from the timing at which the detection sensor S1 detects that the sheet SH has reached a sensor detected position. In the reading operation, the first reading unit 31 reads an image from one side of the sheet SH moving along the first inclined section PB11. Then, the second reading unit 32 located at the stationary reading position reads an image from the other side of the sheet SH moving over the reference section PB10. The sheet SH from which the images have been read then is conveyed along the second inclined section PB12 and is discharged onto the discharge tray 92 by the discharge roller 48 and the pinch roller 48P. Thereafter, the scanning mechanism returns the second reading unit 32 to the standby position. In a case where only one side of a sheet SH is read, only the second reading unit 32 reads an image from the one side of the sheet SH.

In the image reading apparatus 1, a sheet SH may be supported by the support surface 99A of the cover portion 99 located at the open position and an image may be read from the sheet SH being conveyed by the conveying device 4. In this case, as illustrated in FIG. 5, the user moves the cover portion 99 to the open position in a first step. Then, as illustrated in FIG. 6, the user inserts a sheet SH into the fourth path portion PD1 until a leading edge of the sheet SH contacts a nip portion between the second conveying roller 45 and the pinch roller 45P. Thus, the support surface 99A supports the sheet SH.

At that time, the sheet SH inserted into the fourth path portion PD1 contacts the shutter 50 to press the right end portion of the shutter 50 downward against the urging force of the urging spring 59. In response to this, as illustrated in FIG. 14, the shutter 50 moves from the first position to the second position. Thus, in the transmission mechanism 70, the actuating portion 75 moves downward to contact and press the passive portion 76 downward. Therefore, the actuator 60 pivots from the third position to the fourth position. Thus, the detection sensor S1 detects that the actuator 60 is located at the fourth position, and transmits a detection signal to the controller C1 based on the detection result. The controller C1 executes control of the scanning mechanism of the reading device 3 based on the detection signal. This control causes the scanning mechanism to move the second reading unit 32 to the stationary reading position that is located below the reading guide surface 82A, and stop the second reading unit 32 at the stationary reading position. At the stationary reading position, the second reading surface 32A of the second reading unit 32 faces the reference section PB10 of the second path portion PB1.

Subsequent to this, the controller C1 controls the drive portion 4M of the conveying device 4 to activate the conveying device 4. As illustrated in FIG. 6, the conveying device 4 conveys the sheet SH along the second conveying path P2 by pinching the sheet SH supported by the support surface 99A using the second conveying roller 45 and the pinch roller 45P. The sheet SH passes the fourth path portion PD1 while sliding against the shutter 50 located at the second position, and further moves to the second path portion PB1. While the sheet SH moves from the fourth path portion PD1 to the second path portion PB1, the controller C1 controls the first and second reading units 31 and 32. The first reading unit 31 reads an image from one side of the sheet SH moving along the first inclined section PB11. Then, the second reading unit 32 located at the stationary reading position reads an image from the other side of the sheet SH moving over the reference section PB10. The sheet SH from which the images have been read from its both sides is then conveyed along the second inclined section PB12 and is discharged onto the discharge tray 92 by the discharge roller 48 and the pinch roller 48P. Then, the scanning mechanism returns the second reading unit 32 to the standby position. In a case where only one side of a sheet SH is read, only the second reading unit 32 reads an image from the one side of the sheet SH.

In the first illustrative embodiment, when either of the following two situations occurs, the detection sensor S1 detects pivoting of the actuator 60 from the third position to the fourth position. More specifically, in one example situation, a sheet SH fed from the feed tray 91 contacts the actuator 60 in the second path portion PB1. In response to this, the actuator 60 pivots from the third position to the fourth position. Thus, the detection sensor S1 detects the pivoting of the actuator 60 and determines arrival of the sheet SH. In the other example situation, a sheet SH inserted into the fourth path portion PD1 along the support surface 99A of the cover portion 99 contacts the shutter 50 to press the right end portion of the shutter 50 downward. In connection with this, the shutter 50 presses the passive portion 76 downward and the actuator 60 pivots from the third position to the fourth position. Thus, the detection sensor S1 detects the pivoting of the actuator 60 and the controller C1 controls the driving unit 4M. The controller C1 executes different controls depending on whether the actuator 60 has pivoted in which situation. Therefore, before the detection sensor S1 detects pivoting of the actuator 60, the controller C1 needs to determine from which one of the feed tray 91 or the cover portion 99 a sheet SH is fed. In one example, a document sensor may be disposed at the feed tray 91. When the document sensor detects the presence of a sheet SH on the sheet tray 91, the controller C1 determines that the sheet SH is fed from the feed tray 91. Further, another document sensor may be disposed at the cover portion 99. When the document sensor detects the presence of a sheet SH on the cover portion 99, the controller C1 determines that the sheet SH is fed from the cover portion 99. In another example, the position (e.g., the open position or the closed position) of the cover portion 99 may be detected for determining whether a sheet SH is fed from the cover portion 99. When the controller C1 determines that the cover portion 99 is open, the controller C1 may determine that the sheet SH is fed from the cover portion 99. When the controller C1 determines that the cover portion 99 is closed, the controller C1 may determine that the sheet SH is fed from the feed tray 91.

The controller C1 may generate correction data using the first and second reading units 31 and 32 at any time.

In other embodiments, in a case where an image is read from a sheet SH fed through the second conveying path P2, the image reading operation may be executed in another manner. For example, in response to contact of a sheet SH fed through the fourth path portion PD1 with the shutter 50, the shutter 50 may move to the second position (refer to FIG. 14). Thus, the actuating portion 75, the passive portion 76, and the actuator 60 may move in connection with each other and the actuator 60 may move to the fourth position. When the detection sensor S1 detects that the actuator 60 is located at the fourth position, the controller C1 may become in a standby status for waiting input of a user's start instruction, based on the detection signal from the detection sensor S1. In the standby status, the controller C1 is ready to operate the conveying device 4. In response to receipt of a start instruction, the controller C1 may execute an image reading operation by operating the conveying device 4 to convey a sheet SH through the second conveying path P2.

<Effects>

As illustrated in FIGS. 3, 12, and 13, in the image reading apparatus 1 according to the first illustrative embodiment, in a case where the conveying device 4 conveys a sheet SH through the first conveying path P1, the shutter 50 located at the first position blocks the fourth path portion PD1. As illustrated in FIGS. 6 and 14, in a case where the conveying device 4 conveys a sheet SH through the second conveying path P2, the shutter 50 moves to the second position to unblock the fourth path portion PD1. In this state, the shutter 50 located at the second position narrows the clearance between the fourth path portion PD1 and the sheet SH moving in the fourth path portion PD1. In the image reading apparatus 1, such a shutter 50 may reduce or prevent extraneous light intruding from the upstream end of the fourth path portion PD1 from reaching the vicinity of the first and second reading units 31 and 32. Therefore, when correction data is generated by reading the white reference and the black reference using the first reading unit 31, such a configuration may restrict influence of extraneous light on reading using the first reading unit 31. Thus, the first reading unit 31 may obtain correction data precisely. In addition, when correction data is generated by reading the white reference and the black reference using the second reading unit 32, such a configuration may also restrict influence of extraneous light on reading using the second reading unit 32 if the cover unit 99 is opened. Thus, the second reading unit 32 may obtain correction data precisely.

Therefore, the image reading apparatus 1 according to the first illustrative embodiment may restrict quality degradation of image data to be obtained by reading of one or more images from a sheet SH being conveyed by the conveying device 4 using the first and second reading units 31 and 32.

In the image reading apparatus 1, the positional change of the shutter 50 is used by the actuator 60 and the transmission mechanism 70 that move in connection with movement of the shutter 50 for detecting a sheet SH by the detection sensor S1. The controller C1 controls the conveying device 4 based on the detection result of the detection sensor S1. That is, in the image reading apparatus 1, the detection sensor S1 uses the shutter 50 for detecting that a sheet SH has been inserted into the second conveying path P2. Thus, this may achieve reduction of parts count and reduction of manufacturing cost.

As illustrated in FIGS. 6, and 14, in the image reading apparatus 1 according to the first illustrative embodiment, in a case where the conveying device 4 conveys a sheet SH through the second conveying path P2, the shutter 50 located at the second position contacts a sheet SH moving in the fourth path portion PD1 to minimize the clearance between the fourth path portion PD1 and the sheet SH moving in the fourth path portion PD1. Therefore, such a configuration may further reduce or prevent extraneous light intruding from the upstream end of the fourth path portion PD1 from reaching the vicinity of the first and second reading units 31 and 32.

As illustrated in FIG. 13, in the image reading apparatus 1, the actuator 60 moves to the fourth position independently of the shutter 50 in response to contact of the contactable portion 63 with a sheet SH moving along the first inclined section PB11 of the second path portion PB1. Thus, the detection sensor S1 detects that the actuator 60 is located at the fourth position. That is, the detection sensor S1 may detect both of a sheet SH conveyed along the fourth path portion PD1 and a sheet SH conveyed to the second path portion PB1 from the first path portion PA1 via the third path portion PC1. In the image reading apparatus 1, this configuration may therefore further reduce the parts count and also further reduce the manufacturing cost.

As illustrated in FIGS. 8, 12, 13, and 14, in the image reading apparatus 1, the positional change of the shutter 50 may be transmitted to the actuator 60 reliably by the transmission mechanism 70 having a simple configuration.

As illustrated in FIG. 9, in the image reading apparatus 1, the passive portion 76 and the actuating portion 75 are disposed in sheet width direction outside the area where a sheet SH is to be conveyed by the conveying device 4. More specifically, for example, the passive portion 76 and the actuating portion 75 are disposed further to the front than the downstream fifth guide surface 145. Therefore, in the image reading apparatus 1, the passive portion 76 and the actuating portion 75 does not interrupt conveyance of a sheet SH.

As illustrated in FIG. 8, in the image reading apparatus 1, the second chute member 120 may be used both as the member for supporting the shutter 50 movably and the member for supporting the actuator 60 pivotably. Therefore, the shutter 50 and actuator 60, especially the actuating portion 75 and the passive portion 76, may be positioned precisely.

As illustrated in FIGS. 12, 13, and 14, in the image reading apparatus 1, the actuator 60 is supported so as to be pivotable on the first axis X1 that is spaced vertically upward from the second guide surface 122 defining the first inclined section PB11. The distal end, which is positioned downstream from the first axis X1 in the second path portion PB1, i.e., the lower end, of the actuator 60 is movable. Therefore, the direction in which the actuator 60 pivots from the third position to the fourth position corresponds to the direction in which a sheet SH is conveyed along the second path portion PB1. Thus, the actuator 60 might not impart a resistance to conveyance of a sheet SH.

As illustrated in FIGS. 12, 13, and 14, in the image reading apparatus 1, the shutter 50 is supported so as to be pivotable on the second axis X2 that is spaced vertically downward from the downstream fifth guide surface 145. The distal end, which is positioned downstream from the second axis X2 in the fourth path portion PD1, i.e., the right end, of the shutter 60 is movable. Therefore, the direction in which the shutter 50 pivots from the first position to the second position corresponds to the direction in which a sheet SH is conveyed along the fourth path portion PD1. Thus, the shutter 50 might not impart a resistance to conveyance of a sheet SH. As illustrated in FIG. 6, the shutter 50 is urged toward the first position by the urging spring 59. Therefore, the shutter 50 may reliably minimize the clearance between the fourth path portion PD1 and the sheet SH moving in the fourth path portion PD1. Therefore, such a configuration may further reduce or prevent extraneous light from reaching the vicinity of the first and second reading units 31 and 32.

As illustrated in FIG. 6, in the image reading apparatus 1, the shutter 50 located at the second position is positioned in the recessed portion 145H of the downstream fifth guide surface 145 entirely while the upper surface 50A of the shutter 50 defines a portion of the downstream fifth guide surface 145. This configuration may therefore reduce or prevent the shutter 50 located at the second position from imparting a resistance to conveyance of a sheet SH in the fourth path portion PD1.

As illustrated in FIG. 3, in the image reading apparatus 1, the section from the fourth path portion PD1 to the vicinity of the first and second reading surfaces 31A and 32A in the second path portion PB1, i.e., the fourth path portion PD1 and the first inclined section PB11, are defined to be substantially straight by the upstream fifth guide surface 115, the downstream fifth guide surface 145, the sixth guide surface 136, the second guide surface 122, the reading guide surface 83A, the sheet presser 149, and the inclined surface 89A. If no shutter 50 is provided in the image reading apparatus 1, extraneous light may further easily reach the first and second reading surfaces 31A and 32A which are disposed downstream of the substantially straight section. As opposed to this, according to the first illustrative embodiment, in the image reading apparatus 1, the shutter 50 blocks the fourth path portion PD1 effectively. Blocking of the fourth path portion PD1 by the shutter 50 may thus reliably reduce or prevent extraneous light from reaching the vicinity of the first and second reading units 31 and 32.

As illustrated in FIG. 3, in the image reading apparatus 1, when the cover portion 99 is located at the closed position, the cover portion 99 may reduce or prevent intrusion of foreign substances into the fourth path portion PD1 except a sheet SH. When the first and second reading units 31 and 32 read images from respective sides of a sheet SH being conveyed from the first path portion PA1 to the second path portion PB1 via the third path portion PC1, the cover portion 99 located at the closed position may also reduce or prevent extraneous light from reaching the vicinity of the first and second reading units 31 and 32. As illustrated in FIG. 6, when the sheet SH is being inserted into the fourth path portion PD1, the support surface 99A of the cover portion 99 located at the open position supports the sheet SH from below. Therefore, the user may insert the sheet SH into the fourth path portion PD1 smoothly.

Second Illustrative Embodiment

Figure 15:
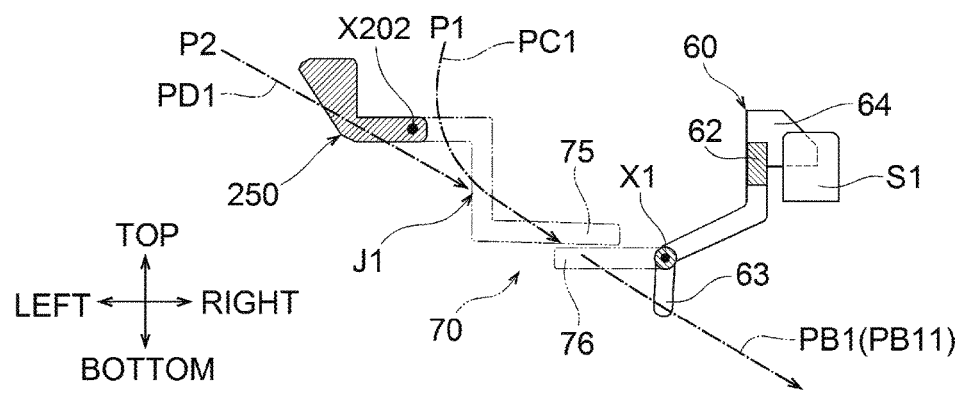
FIG. 15 is a schematic view for explaining how a shutter, an actuator, a transmission mechanism, and a detection sensor of an image reading apparatus behave in a second illustrative embodiment according to one or more aspects of the disclosure.
Figure 16:
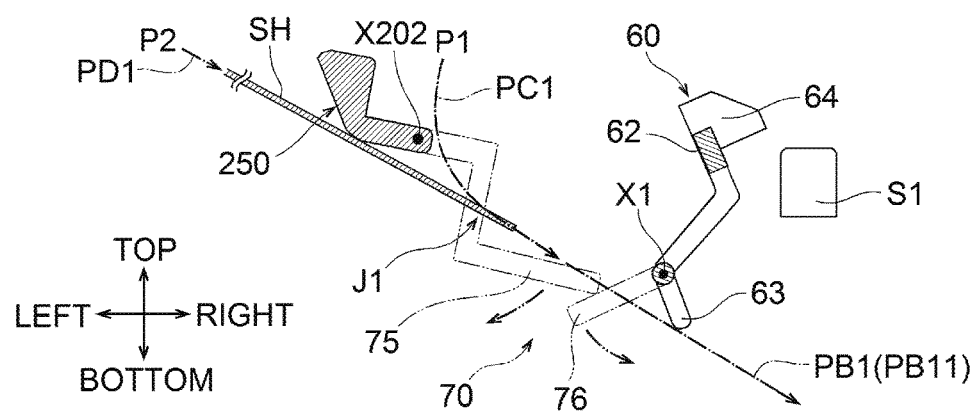
FIG. 16 is a schematic view for explaining how the shutter, the actuator, the transmission mechanism, and the detection sensor of the image reading apparatus behave in the second illustrative embodiment according to one or more aspects of the disclosure.

As illustrated in FIGS. 15 and 16, an image reading apparatus according to a second illustrative embodiment includes a shutter 250 instead of the shutter 50 of the first illustrative embodiment. The other components or configuration according to the second illustrative embodiment are the same or similar to those according to the first illustrative embodiment. Therefore, an explanation will be given mainly for the components different from the first illustrative embodiment, and an explanation will be omitted for the common components by assigning the same reference numerals thereto.

The shutter 250 is movable between a first position (refer to FIG. 15) and a second position (refer to FIG. 16) by pivoting on a second axis X202. The second axis X202 is spaced vertically upward from a guide surface (e.g., the sixth guide surface 136 of the first illustrative embodiment) defining the fourth path portion PD1. Similar to the first illustrative embodiment, the shutter 250 includes an actuating portion 75 at its front end portion. In the second illustrative embodiment, the actuating portion 75 and the passive portion 76 each have a different dimension as compared with the actuating portion 75 and the passive portion 76 of the first illustrative embodiment.

As illustrated in FIG. 15, when the shutter 250 is located at the first position, the shutter 250 extends leftward from the second axis X202 and intersects the fourth path portion PD1. The shutter 250 further extends diagonally upward toward the left. The shutter 250 is urged downward by its own weight. Thus, the shutter 250 blocks the fourth path portion PD1 when located at the fourth position.

As illustrated in FIG. 16, when a sheet SH is inserted into the fourth path portion PD1, the sheet SH contacts the shutter 250 to press the shutter 250 upward. Thus, the shutter 250 moves from the first position to the second position. In response to this, the actuating portion 75 moves downward to contact and press the passive portion 76 downward. Therefore, the actuator 60 pivots from the third position to the fourth position.

Therefore, similar to the image reading apparatus 1 according to the first illustrative embodiment, the image reading apparatus having such a configuration according to the second illustrative embodiment may also restrict quality degradation of image data to be obtained by reading of one or more images from a sheet SH being conveyed by the conveying device 4 using the first and second reading units 31 and 32.

Third Illustrative Embodiment

Figure 17:
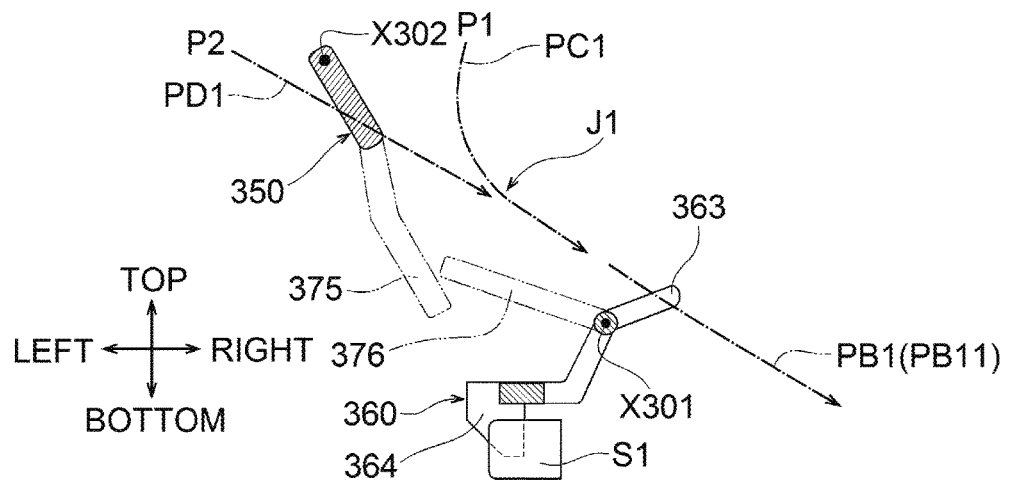
FIG. 17 is a schematic view for explaining how a shutter, an actuator, a transmission mechanism, and a detection sensor of an image reading apparatus behave in a third illustrative embodiment according to one or more aspects of the disclosure.
Figure 18:
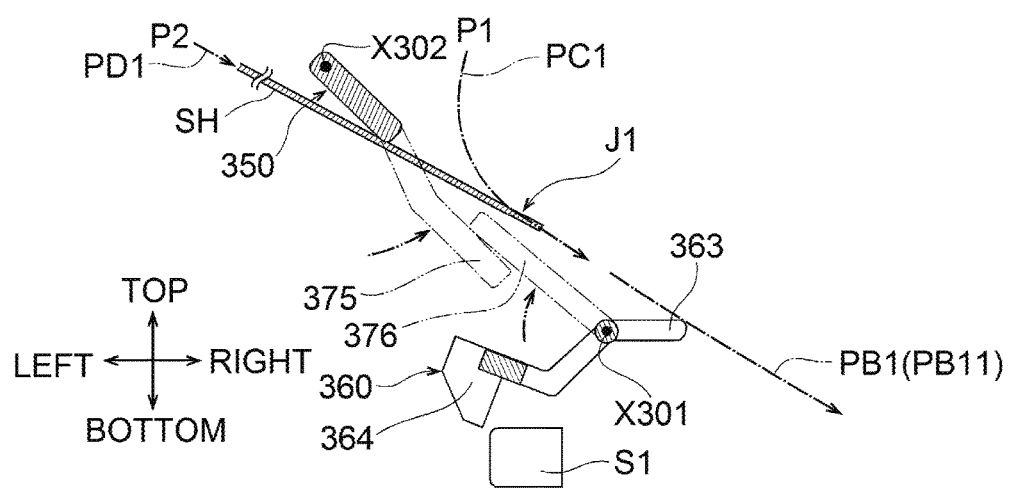
FIG. 18 is a schematic view for explaining how the shutter, the actuator, the transmission mechanism, and the detection sensor of the image reading apparatus behave in the third illustrative embodiment according to one or more aspects of the disclosure.

As illustrated in FIGS. 17 and 18, an image reading apparatus according to a third illustrative embodiment includes a shutter 350 instead of the shutter 50 of the first illustrative embodiment. The detection sensor S1 is disposed at a different position from the detection sensor S1 of the first illustrative embodiment. More specifically, in the third illustrative embodiment, the detection sensor S1 is disposed on the side opposite to where the detection sensor S1 of the first illustrative embodiment is disposed, relative to the first inclined section PB11. In the third illustrative embodiment, the image reading apparatus includes an actuator 360 instead of the actuator 60 of the first illustrative embodiment. The image reading apparatus further includes an actuating portion 375 and a passive portion 376 instead of the actuating portion 75 and the passive portion 76 of the first illustrative embodiment. The other components or configuration according to the third illustrative embodiment are the same or similar to those according to the first illustrative embodiment. Therefore, an explanation will be given mainly for the components different from the first illustrative embodiment, and an explanation will be omitted for the common components by assigning the same reference numerals thereto.

The shutter 350 is movable between a first position (refer to FIG. 17) and a second position (refer to FIG. 18) by pivoting on a second axis X302. The second axis X302 is spaced vertically upward from a guide surface (e.g., the sixth guide surface 136 of the first illustrative embodiment) defining the fourth path portion PD1.

As illustrated in FIG. 17, when the shutter 350 is located at the first position, the shutter 350 extends downward toward the right from the second axis X302 and intersects the fourth path portion PD1. The shutter 350 is urged downward by its own weight. Thus, the shutter 350 blocks the fourth path portion PD1 when located at the first position. The actuating portion 375 is disposed in sheet width direction outside the area where a sheet SH is to be conveyed by the conveying device 4. The actuating portion 375 extends downward toward the right from a lower end of the shutter 350.

As illustrated in FIG. 18, when a sheet SH is inserted into the fourth path portion PD1, the sheet SH contacts a lower end portion of the shutter 350 to press the shutter 350 upward. Thus, the shutter 350 moves from the first position to the second position. In connection with this, the actuating portion 375 moves upwardly rightward.

The actuator 360 is movable between a third position (refer to FIG. 17) and a fourth position (refer to FIG. 8) by pivoting on a first axis X301. The first axis X301 is spaced vertically downward from the first inclined section PB11 of the second path portion PB1.

As illustrated in FIG. 17, in a state where the actuator 360 is located at the third position, the contactable portion 363 extends upward toward the right from the first axis X301 and intersects the first inclined section PB11 of the second path portion PB1. The blocking portion 364 blocks the optical path in which light emitted from the detection sensor S1 travels. The passive portion 376 is disposed in sheet width direction outside the area where a sheet SH is to be conveyed by the conveying device 4. The passive portion 376 extends leftward from the first axis X301. A left end portion of the passive portion 376 is positioned adjacent to a lower end portion of the actuating portion 375.

As illustrated in FIG. 18, in response to movement of the shutter 350 from the first position to the second position, the actuating portion 375 moves upwardly rightward to contact and press the passive portion 376 upward. Therefore, the actuator 360 moves from the third position to the fourth position.

In a state where the actuator 360 is located at the fourth position, a right end of the contactable portion 363 is located further downstream of the second path portion PB1 and thus the contactable portion 363 does not intersect the first inclined section PB11 of the second path portion PB1. The blocking portion 364 unblocks the optical path in which light emitted from the detection sensor S1 travels.

Therefore, similar to the image reading apparatuses according to the first and second illustrative embodiments, the image reading apparatus having such a configuration according to the third illustrative embodiment may also restrict quality degradation of image data to be obtained by reading of one or more images from a sheet SH being conveyed by the conveying device 4 using the first and second reading units 31 and 32.

Fourth Illustrative Embodiment

Figure 19:
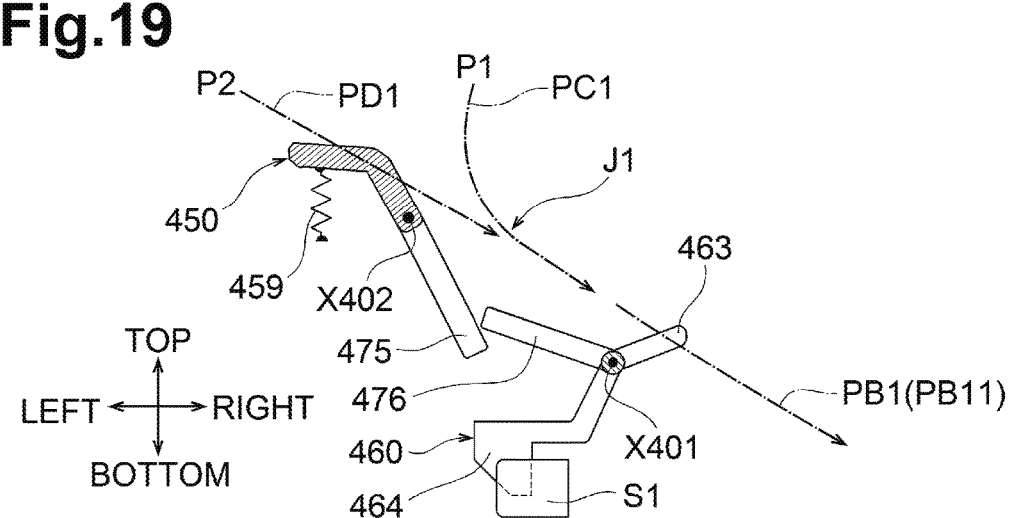
FIG. 19 is a schematic view for explaining how a shutter, an actuator, a transmission mechanism, and a detection sensor of an image reading apparatus behave in a fourth illustrative embodiment according to one or more aspects of the disclosure.
Figure 20:
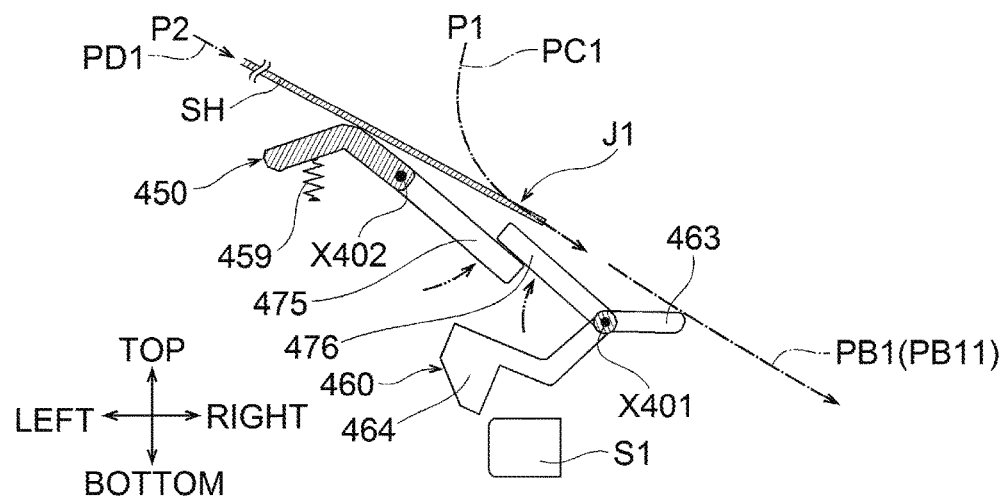
FIG. 20 is a schematic view for explaining how the shutter, the actuator, the transmission mechanism, and the detection sensor of the multifunction device behave in the fourth illustrative embodiment according to one or more aspects of the disclosure.

As illustrated in FIGS. 19 and 20, an image reading apparatus according to a fourth illustrative embodiment includes a shutter 450 instead of the shutter 50 of the first illustrative embodiment. The detection sensor S1 is disposed at a different position from the detection sensor S1 of the first illustrative embodiment. More specifically, in the fourth illustrative embodiment, the detection sensor S1 is disposed on the side opposite to where the detection sensor S1 of the first illustrative embodiment is disposed, relative to the first inclined section PB11. In the fourth illustrative embodiment, the image reading apparatus includes an actuator 460 instead of the actuator 60 of the first illustrative embodiment. The image reading apparatus further includes an actuating portion 475 and a passive portion 476 instead of the actuating portion 75 and the passive portion 76 of the first illustrative embodiment. The other components or configuration according to the fourth illustrative embodiment are the same or similar to those according to the first illustrative embodiment. Therefore, an explanation will be given mainly for the components different from the first illustrative embodiment, and an explanation will be omitted for the common components by assigning the same reference numerals thereto.

The shutter 450 is movable between a first position (refer to FIG. 19) and a second position (refer to FIG. 20) by pivoting on a second axis X402. The second axis X402 is spaced vertically downward from a guide surface (e.g., the upstream fifth guide surface 115 and the downstream fifth guide surface 116 of the first illustrative embodiment) defining the fourth path portion PD1.

As illustrated in FIG. 19, when the shutter 450 is located at the first position, the shutter 450 extends upward toward the left from the second axis X402 and intersects the fourth path portion PD1. The shutter 450 further extends leftward. The shutter 450 is urged upward by an urging spring 459. Thus, when the shutter 450 is located at the first position, the shutter 450 blocks the fourth path portion PD1. The actuating portion 475 extends downward toward the right from an end of a lower end portion having the second axis X402, of the shutter 450. In the fourth illustrative embodiment, the actuating portion 475 might not necessarily be disposed in sheet width direction outside the area where a sheet SH is to be conveyed by the conveying device 4.

As illustrated in FIG. 20, when a sheet SH is inserted into the fourth path portion PD1, the sheet SH contacts and presses the shutter 450 downward. Thus, the shutter 450 moves from the first position to the second position. In connection with this, the actuating portion 475 moves upwardly rightward.

The actuator 460 is movable between a third position (refer to FIG. 19) and a fourth position (refer to FIG. 20) by pivoting on the first axis X401. The first axis X401 is spaced vertically downward from the first inclined section PB11 of the second path portion PB1.

As illustrated in FIG. 19, in a state where the actuator 460 is located at the third position, the contactable portion 463 extends upward toward the right from the first axis X401 and intersects the first inclined section PB11 of the second path portion PB1. The blocking portion 464 blocks the optical path in which light emitted from the detection sensor S1 travels. The passive portion 467 extends leftward from the first axis X401. A left end portion of the passive portion 476 is positioned adjacent to a lower end portion of the actuating portion 475. In the fourth illustrative embodiment, the position of the passive portion 476 might not necessarily be disposed in sheet width direction outside the area where a sheet SH is to be conveyed by the conveying device 4. The position of the passive portion 476 may be determined based on the relative positional relationship between the actuating portion 475 and the passive portion 476.

As illustrated in FIG. 20, in response to movement of the shutter 450 from the first position to the second position, the actuating portion 475 moves upwardly rightward to contact and press the passive portion 476 upward. In response to this, the actuator 460 moves from the third position to the fourth position.

In a state where the actuator 460 is located at the fourth position, a right end of the contactable portion 463 is located further downstream of the second path portion PB1 and thus the contactable portion 363 does not intersect the first inclined section PB11 of the second path portion PB1. The blocking portion 464 unblocks the optical path in which light emitted from the detection sensor S1 travels.

Therefore, similar to the image reading apparatuses according to the first, second, and third illustrative embodiments, the image reading apparatus having such a configuration according to the fourth illustrative embodiment may also restrict quality degradation of image data to be obtained by reading of one or more images from a sheet SH being conveyed by the conveying device 4 using the first and second reading units 31 and 32.

While the disclosure has been described in detail with reference to the specific embodiments thereof, these are merely examples, and various changes, arrangements and modifications may be applied therein without departing from the spirit and scope of the disclosure.

In the first to fourth illustrative embodiments, the detection sensor S1 is configured to detect both of a sheet SH conveyed along the fourth path portion PD1 and a sheet SH conveyed to the second path portion PB1 from the first path portion PA1 via the third path portion PC1. Nevertheless, in other embodiments, for example, another detection sensor may be provided in the fourth path portion PD1 and this detection sensor may be configured to detect whether the moving unit that moves in connection with the shutter is located at the fourth position.

In other embodiments, for example, the third path portion may have a curved section and a straight section and may connect the first path portion and the second path portion. The detection sensor is not limited to the photointerrupter. In other embodiments, for example, the detection sensor may be a proximity sensor or a micro switch.

The disclosure may be adapted to an image reading apparatus with or without an image forming device.

What is claimed is:

1. An image reading apparatus comprising:
    a conveying device defining a first conveying path and a second conveying path which are joined at a junction into a common path portion shared by the first conveying path and the second conveying path, the conveying device being configured to convey a sheet selectively along the first conveying path and the second conveying path;
    at least one reading unit configured to read an image of the sheet conveyed in the common path portion;
    a shutter disposed in the second conveying path at a position upstream of the junction in a sheet conveying direction, the shutter being movable between a first position at which the shutter blocks the second conveying path and a second position at which the shutter opens the second conveying path;
    an urging member configured to urge the shutter toward the first position;
    an actuator disposed in the common path portion and movable between a third position and a fourth position in response to the shutter moving between the first position and the second position, respectively;
    a detection sensor configured to detect whether the actuator is at the fourth position; and
    a controller configured to, in a case where the detection sensor detects that the actuator is at the fourth position, control the conveying device to convey the sheet along the second conveying path.

2. The image reading apparatus according to claim 1, wherein the shutter is configured to, when at the second position, slidably contact the sheet being conveyed toward the junction along the second conveying path.

3. The image reading apparatus according to claim 1, wherein the detection sensor is disposed in the common path portion at a position upstream of the reading unit in the sheet conveying direction.

4. The image reading apparatus according to claim 1, further comprising a transmission mechanism disposed between the shutter and the actuator and configured to pivot the actuator from the third position to the fourth position by transmitting movement of the shutter from the first position to the second position.

5. The image reading apparatus comprising according to claim 1, wherein the actuator is movable from the third position to the fourth position upon contact with the sheet conveyed, along the first conveying path, into the common path portion.

6. The image reading apparatus according to claim 4, wherein the transmission mechanism includes:
    a passive portion disposed at the actuator; and
    an actuating portion disposed at the shutter and configured to pivot the actuator to the fourth position by contacting the passive portion in response to the shutter moving to the second position.

7. The image reading apparatus according to claim 6, wherein the actuating portion and the passive portion are disposed outside, in a sheet width direction, of an area where the sheet is conveyed, the sheet width direction being orthogonal to the sheet conveying direction.

8. The image reading apparatus according to claim 1, further comprising a support member which supports the shutter movably and the actuator pivotably.

9. The image reading apparatus according to claim 1,
    wherein the conveying device includes an upper guide surface defining, from above, the common path portion, and
    wherein the actuator is pivotable about an axis, which is spaced vertically upward from the upper guide surface, such that a distal end portion of the actuator is movable, the distal end portion being located downstream of the axis in the sheet conveying direction.

10. An image reading apparatus comprising:
    a conveying device defining a first conveying path and a second conveying path which are joined at a junction into a common path portion shared by the first conveying path and the second conveying path, the conveying device being configured to convey a sheet selectively along the first conveying path and the second conveying path;
    at least one reading unit configured to read an image of the sheet conveyed in the common path portion;
    a shutter disposed in the second conveying path at a position upstream of the junction in a sheet conveying direction, the shutter being movable between a first position at which the shutter blocks the second conveying path and a second position at which the shutter opens the second conveying path;
    an actuator disposed in the common path portion and movable between a third position and a fourth position in response to the shutter moving between the first position and the second position, respectively;
    a detection sensor configured to detect whether the actuator is at the fourth position; and
    a controller configured to, in a case where the detection sensor detects that the actuator is at the fourth position, control the conveying device to convey the sheet along the second conveying path,
    wherein the conveying device further includes a lower guide surface defining, from below, a path portion of the second conveying path, the path portion being located upstream of the junction in the sheet conveying direction, and
    wherein the shutter is pivotable about an axis, which is spaced vertically downward from the lower guide surface, such that a distal end portion of the shutter is movable, the distal end portion being located downstream of the axis in the sheet conveying direction.

11. The image reading apparatus according to claim 10, further comprising an urging member configured to urge the shutter toward the first position.

12. The image reading apparatus according to claim 10, wherein the lower guide surface has a recessed portion, and the shutter at the second position is located in the recessed portion such that an upper surface of the shutter defines a part of the lower guide surface.

13. The image reading apparatus according to claim 1, wherein the at least one reading unit includes a first reading unit having a first reading surface which faces down the common path portion, and the second conveying path includes a substantially straight path portion extending from an upstream end in the sheet conveying direction of the second conveying path toward the first reading surface.

14. The image reading apparatus according to claim 1, wherein the at least one reading unit includes a second reading unit having a second reading surface which faces up the common path portion, and the second conveying path includes a substantially straight path portion extending from an upstream end in the sheet conveying direction of the second conveying path toward the second reading surface.

15. The image reading apparatus according to claim 1, further comprising:
    a housing having an outer surface and accommodating the conveying device therein; and
    a cover portion movable between a closed position at which the cover portion forms a part of the outer surface and conceals an upstream end in the sheet conveying direction of the second conveying path, and an open position at which the cover portion exposes the upstream end of the second conveying path, the cover portion having a support surface configured to, when the cover portion is located at the open position, support, from below, the sheet inserted from the upstream end.

16. The image reading apparatus according to claim 1, wherein the conveying device defines:
    a first path portion;
    a second path portion below the first path portion, the second path portion corresponding to the common path portion;
    a third path portion which is curved and connected to both the first path portion and the second path portion; and
    a fourth path portion connected, at the junction, to the third path portion to lead to the second path portion, the first path portion and the fourth path portion being connected to the third path portion from different directions,
    wherein the first conveying path extends from the first path portion, via the third path portion, to the second path portion, and the second conveying path extends from the fourth path portion to the second path portion.

17. An image reading apparatus comprising:
    a tray configured to support a sheet to be conveyed into a first conveying path;
    an insertion guide configured to guide insertion of a sheet into a second conveying path;
    a conveying device configured to convey the sheet selectively along the first conveying path and the second conveying path, the first conveying path and the second conveying path being joined at a junction into a common path portion shared by the first conveying path and the second conveying path;
    a reading unit disposed in the common path portion and configured to read an image of the sheet conveyed by the conveying device;
    a partition rib disposed between the insertion guide and the junction in the second conveying path, the insertion guide extending over an entire width of an area where the sheet is conveyed, the width being orthogonal to a sheet conveying direction;
    a shutter movable between a first position at which the shutter contacts the partition rib to block the second conveying path, and a second position at which the shutter is separated from the partition rib to open the second conveying path, the shutter extending over the entire width of the area where the sheet is conveyed;
    an actuator disposed in the common path portion at a position upstream of the reading unit in the sheet conveying direction, the actuator being movable between a third position and a fourth position; and
    a detection sensor configured to detect whether the actuator is at the fourth position,
    wherein the shutter and the actuator are configured such that:
        in a case where the sheet is inserted along the insertion guide into the second conveying path, the shutter moves from the first position to the second position upon contact with the inserted sheet, and the actuator moves from the third position to the fourth position in response to the shutter moving from the first position to the second position; and
        in a case where the sheet is conveyed along the first conveying path from the tray toward the reading unit, the actuator moves from the third position to the fourth position, independently of the shutter located at the first position, upon contact with the sheet conveyed into the common path portion.

18. The image reading apparatus according to claim 17, further comprising a controller,
    wherein the conveying device includes a conveying roller disposed in the common path portion at a position upstream of the actuator in the sheet conveying direction, and
    wherein the controller is configured to actuate the conveying roller when the detection sensor detects that the actuator is at the fourth position in the case where the sheet is inserted along the insertion guide.

19. An image reading apparatus comprising:
    a tray extending along a first conveying path;
    an insertion guide extending along a second conveying path, wherein one end of the first conveying path meets one end of the second conveying path at a junction from which a common path extends;
    a first roller disposed in the first conveying path;
    a second roller disposed in the common path;
    a reading unit disposed in the common path and configured to read an image;
    a partition rib disposed in the second conveying path and between the insertion guide and the junction, the partition rib having a first width orthogonal to an extending direction of the second conveying path, the first width being greater than or equal to a particular width;
    a shutter disposed in the second conveying path and having a first link, the shutter being movable between a first shutter position and a second shutter position, the shutter having a second width orthogonal to the extending direction of the second conveying path, the second width being greater than or equal to the particular width;
    an actuator disposed in the common path and having a second link, the actuator being movable between a first actuator position and a second actuator position;
    a detector disposed in the common path; and
    a controller,
    wherein:
        when the shutter is at the first shutter position, the shutter contacts the partition rib,
        when the shutter is at the second shutter position, the first link of the shutter causes the second link of the actuator to move the actuator from the first actuator position to the second actuator position, and the controller is configured to, when the controller determines that the detector detects movement of the actuator from the first actuator position to the second actuator position, cause the second roller to start rotating for conveying a sheet on the insertion guide to the reading unit.

20. The image reading apparatus according to claim 19, wherein the insertion guide has a width which is orthogonal to the extending direction of the second conveying path and equal to the particular width.

* * * * *